(12) United States Patent
Kornegay et al.

(10) Patent No.: US 8,589,286 B1
(45) Date of Patent: *Nov. 19, 2013

(54) CREDIT SCORE SIMULATION

(75) Inventors: Adam T. Kornegay, McKinney, TX (US); Matthew R. Schwab, McKinney, TX (US); Marcos C. de Almeida, Allen, TX (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,527

(22) Filed: Sep. 14, 2012

Related U.S. Application Data

(63) Continuation of application No. 13/041,274, filed on Mar. 4, 2011, now Pat. No. 8,321,334, which is a continuation of application No. 12/563,779, filed on Sep. 21, 2009, now Pat. No. 7,925,582, which is a continuation of application No. 11/150,480, filed on Jun. 10, 2005, now Pat. No. 7,593,891, which is a continuation-in-part of application No. 10/452,155, filed on May 30, 2003, now Pat. No. 7,610,229.

(51) Int. Cl.
*G06Q 40/00* (2012.01)

(52) U.S. Cl.
USPC ............................................. 705/38; 705/35

(58) Field of Classification Search
USPC ..................................................... 705/35, 38
See application file for complete search history.

(56) References Cited

U.S. PATENT DOCUMENTS

| | | |
|---|---|---|
| 3,316,395 A | 4/1967 | Lavin et al. |
| 4,305,059 A | 12/1981 | Benton |
| 4,578,530 A | 3/1986 | Zeidler |
| 4,736,294 A | 4/1988 | Gill |
| 4,774,664 A | 9/1988 | Campbell et al. |
| 4,876,592 A | 10/1989 | Von Kohorn |
| 4,895,518 A | 1/1990 | Arnold |
| 4,947,028 A | 8/1990 | Gorog |

(Continued)

FOREIGN PATENT DOCUMENTS

| | | |
|---|---|---|
| EP | 0 869 652 | 10/1998 |
| EP | 0 913 789 | 5/1999 |

(Continued)

OTHER PUBLICATIONS

Announcing TrueProfiler, http://web.archive.org/web/20021201123646/http://www.truecredit.com/index.asp, dated Dec. 1, 2002, 2 pages.

(Continued)

*Primary Examiner* — Lalita M Hamilton
(74) *Attorney, Agent, or Firm* — Knobbe Martens Olson & Bear LLP

(57) ABSTRACT

Systems and methods are described that simulate a credit score. The system enables a user to modify a credit data element in order to determine its effect on a credit score. The user can modify the element directly or simulate an action that, if performed, would modify the element. Since the number of possible modifications and actions can be overwhelming, in one embodiment, the system suggests modifications and actions to be simulated. These suggestions can be tailored to a user's goal, such as increasing a credit score by a particular number of points or allocating a particular sum of money in order to maximize a credit score. In one embodiment, the system obtains credit data from multiple credit bureaus and can determine credit scores using different algorithms, such as the different algorithms used by the different credit bureaus.

11 Claims, 44 Drawing Sheets

(56) References Cited

U.S. PATENT DOCUMENTS

| | | | |
|---|---|---|---|
| 5,025,373 A | 6/1991 | Keyser, Jr. et al. |
| 5,034,807 A | 7/1991 | Von Kohorn |
| 5,060,153 A | 10/1991 | Nakagawa |
| 5,148,365 A | 9/1992 | Dembo |
| 5,220,501 A | 6/1993 | Lawlor et al. |
| 5,259,766 A | 11/1993 | Sack |
| 5,262,941 A | 11/1993 | Saladin |
| 5,274,547 A | 12/1993 | Zoffel et al. |
| 5,297,031 A | 3/1994 | Gutterman et al. |
| 5,336,870 A | 8/1994 | Hughes et al. |
| 5,590,038 A | 12/1996 | Pitroda |
| 5,611,052 A | 3/1997 | Dykstra et al. |
| 5,615,408 A | 3/1997 | Johnson |
| 5,630,127 A | 5/1997 | Moore et al. |
| 5,640,577 A | 6/1997 | Scharmer |
| 5,689,651 A | 11/1997 | Lozman |
| 5,696,907 A | 12/1997 | Tom |
| 5,704,029 A | 12/1997 | Wright, Jr. |
| 5,732,400 A | 3/1998 | Mandler |
| 5,774,883 A | 6/1998 | Andersen |
| 5,793,972 A | 8/1998 | Shane |
| 5,844,218 A | 12/1998 | Kawan et al. |
| 5,875,236 A | 2/1999 | Jankowitz |
| 5,878,403 A | 3/1999 | DeFrancesco |
| 5,924,082 A | 7/1999 | Silverman et al. |
| 5,930,764 A | 7/1999 | Melchione et al. |
| 5,930,776 A | 7/1999 | Dykstra et al. |
| 5,940,812 A | 8/1999 | Tengel et al. |
| 5,950,172 A | 9/1999 | Klingman |
| 5,956,693 A | 9/1999 | Geerlings |
| 5,966,695 A | 10/1999 | Melchione et al. |
| 5,995,947 A | 11/1999 | Fraser et al. |
| 6,029,149 A | 2/2000 | Dykstra et al. |
| 6,038,551 A | 3/2000 | Barlow et al. |
| 6,064,987 A | 5/2000 | Walker |
| 6,070,141 A | 5/2000 | Houvener |
| 6,088,686 A | 7/2000 | Walker et al. |
| 6,094,643 A | 7/2000 | Anderson et al. |
| 6,105,007 A | 8/2000 | Norris |
| 6,115,690 A | 9/2000 | Wong |
| 6,119,103 A | 9/2000 | Basch et al. |
| 6,128,599 A | 10/2000 | Walker |
| 6,128,603 A | 10/2000 | Dent |
| 6,202,053 B1 | 3/2001 | Christiansen et al. |
| 6,249,770 B1 | 6/2001 | Erwin et al. |
| 6,311,169 B2 | 10/2001 | Duhon |
| 6,324,524 B1 | 11/2001 | Lent et al. |
| 6,330,575 B1 | 12/2001 | Moore |
| 6,385,594 B1 | 5/2002 | Lebda et al. |
| 6,405,173 B1 | 6/2002 | Honarvar |
| 6,405,181 B2 | 6/2002 | Lent et al. |
| 6,408,282 B1 | 6/2002 | Buist |
| 6,567,791 B2 | 5/2003 | Lent et al. |
| 6,611,816 B2 | 8/2003 | Lebda et al. |
| 6,622,131 B1 | 9/2003 | Brown et al. |
| 6,658,393 B1 | 12/2003 | Basch et al. |
| 6,766,304 B2 | 7/2004 | Kemp et al. |
| 6,772,132 B1 | 8/2004 | Kemp et al. |
| 6,804,346 B1 | 10/2004 | Mewhinney |
| 6,901,406 B2 | 5/2005 | Nabe et al. |
| 6,910,624 B1 | 6/2005 | Natsuno |
| 6,938,011 B1 | 8/2005 | Kemp et al. |
| 6,950,807 B2 | 9/2005 | Brock |
| 6,962,336 B2 | 11/2005 | Glass |
| 6,985,887 B1 | 1/2006 | Sunstein et al. |
| 6,988,085 B2 | 1/2006 | Hedy |
| 6,993,504 B1 | 1/2006 | Friesen et al. |
| 7,028,052 B2 | 4/2006 | Chapman et al. |
| 7,076,462 B1 | 7/2006 | Nelson et al. |
| 7,127,424 B2 | 10/2006 | Kemp et al. |
| 7,143,063 B2 | 11/2006 | Lent |
| 7,212,999 B2 | 5/2007 | Friesen et al. |
| 7,228,289 B2 | 6/2007 | Brumfield et al. |
| 7,249,076 B1 | 7/2007 | Pendleton et al. |
| 7,280,980 B1 | 10/2007 | Hoadley et al. |
| 7,337,133 B1 | 2/2008 | Bezos et al. |
| 7,337,468 B2 | 2/2008 | Metzger |
| 7,389,268 B1 | 6/2008 | Kemp et al. |
| 7,409,369 B1 | 8/2008 | Homuth et al. |
| 7,451,095 B1 | 11/2008 | Bradley et al. |
| 7,505,939 B2 | 3/2009 | Lent et al. |
| 7,529,698 B2 | 5/2009 | Joao |
| 7,542,993 B2 | 6/2009 | Satterfield et al. |
| 7,552,086 B1 | 6/2009 | Rajasekar et al. |
| 7,593,891 B2 | 9/2009 | Kornegay et al. |
| 7,610,229 B1 | 10/2009 | Kornegay |
| 7,711,635 B2 | 5/2010 | Steele et al. |
| 7,711,636 B2 | 5/2010 | Robida et al. |
| 7,788,147 B2 | 8/2010 | Haggerty et al. |
| 7,788,152 B2 | 8/2010 | Haggerty et al. |
| 7,792,715 B1 | 9/2010 | Kasower |
| 7,792,732 B2 | 9/2010 | Haggerty et al. |
| 7,814,004 B2 | 10/2010 | Haggerty et al. |
| 7,814,005 B2 | 10/2010 | Imrey et al. |
| 7,818,228 B1 | 10/2010 | Coulter |
| 7,840,484 B2 | 11/2010 | Haggerty et al. |
| 7,877,304 B1 | 1/2011 | Coulter |
| 7,890,420 B2 | 2/2011 | Haggerty et al. |
| 7,904,306 B2 | 3/2011 | Johnson et al. |
| 7,912,770 B2 | 3/2011 | Haggerty et al. |
| 7,925,582 B1 | 4/2011 | Kornegay et al. |
| 7,970,679 B2 | 6/2011 | Kasower |
| 8,015,107 B2 | 9/2011 | Kornegay et al. |
| 8,073,768 B2 | 12/2011 | Haggerty et al. |
| 8,078,524 B2 | 12/2011 | Crawford et al. |
| 8,195,549 B2 | 6/2012 | Kasower |
| 8,321,334 B1 | 11/2012 | Kornegay et al. |
| 8,335,741 B2 | 12/2012 | Kornegay et al. |
| 2001/0011245 A1 | 8/2001 | Duhon |
| 2001/0039523 A1 | 11/2001 | Iwamoto |
| 2001/0049672 A1 | 12/2001 | Moore et al. |
| 2002/0032645 A1 | 3/2002 | Nozaki et al. |
| 2002/0032647 A1 | 3/2002 | Delinsky et al. |
| 2002/0035511 A1 | 3/2002 | Haji et al. |
| 2002/0069122 A1 | 6/2002 | Yun et al. |
| 2002/0073017 A1 | 6/2002 | Robertson |
| 2002/0077964 A1 | 6/2002 | Brody et al. |
| 2002/0099641 A1 | 7/2002 | Mills et al. |
| 2002/0111890 A1 | 8/2002 | Sloan et al. |
| 2002/0128962 A1 | 9/2002 | Kasower |
| 2002/0147695 A1 | 10/2002 | Khedkar et al. |
| 2002/0169747 A1 | 11/2002 | Chapman et al. |
| 2002/0198824 A1 | 12/2002 | Cook |
| 2003/0004853 A1 | 1/2003 | Ram et al. |
| 2003/0009411 A1 | 1/2003 | Ram et al. |
| 2003/0009418 A1 | 1/2003 | Green et al. |
| 2003/0018549 A1 | 1/2003 | Fei et al. |
| 2003/0028477 A1 | 2/2003 | Stevenson et al. |
| 2003/0065563 A1 | 4/2003 | Elliott et al. |
| 2003/0154162 A1 | 8/2003 | Danaher et al. |
| 2003/0163435 A1 | 8/2003 | Payone |
| 2003/0236738 A1 | 12/2003 | Lange et al. |
| 2004/0006536 A1 | 1/2004 | Kawashima et al. |
| 2004/0010458 A1 | 1/2004 | Friedman |
| 2004/0030621 A1 | 2/2004 | Cobb |
| 2004/0030629 A1 | 2/2004 | Freeman et al. |
| 2004/0030649 A1 | 2/2004 | Nelson et al. |
| 2004/0107132 A1 | 6/2004 | Honarvar et al. |
| 2004/0111292 A1 | 6/2004 | Hutchins |
| 2004/0111358 A1 | 6/2004 | Lange et al. |
| 2004/0111359 A1 | 6/2004 | Hudock |
| 2004/0138995 A1 | 7/2004 | Hershkowitz et al. |
| 2004/0158521 A1 | 8/2004 | Newton |
| 2004/0186807 A1 | 9/2004 | Nathans et al. |
| 2004/0199456 A1 | 10/2004 | Flint et al. |
| 2005/0154664 A1 | 7/2005 | Guy et al. |
| 2005/0283415 A1 | 12/2005 | Studnitzer et al. |
| 2006/0014129 A1 | 1/2006 | Coleman et al. |
| 2006/0059083 A1 | 3/2006 | Friesen et al. |
| 2006/0080251 A1 | 4/2006 | Fried et al. |
| 2006/0095363 A1 | 5/2006 | May |
| 2006/0100954 A1 | 5/2006 | Schoen |
| 2006/0155639 A1 | 7/2006 | Lynch et al. |
| 2006/0173772 A1 | 8/2006 | Hayes et al. |

(56) References Cited

U.S. PATENT DOCUMENTS

| | | |
|---|---|---|
| 2006/0178971 A1 | 8/2006 | Owen et al. |
| 2006/0178983 A1 | 8/2006 | Nice et al. |
| 2006/0233332 A1 | 10/2006 | Toms |
| 2006/0242039 A1 | 10/2006 | Haggerty et al. |
| 2006/0265323 A1 | 11/2006 | Winter et al. |
| 2007/0016500 A1 | 1/2007 | Chatterji et al. |
| 2007/0016501 A1 | 1/2007 | Chatterji et al. |
| 2007/0067206 A1 | 3/2007 | Haggerty et al. |
| 2007/0078741 A1 | 4/2007 | Haggerty et al. |
| 2007/0100719 A1 | 5/2007 | Chwast et al. |
| 2007/0233591 A1 | 10/2007 | Newton |
| 2007/0244732 A1 | 10/2007 | Chatterji et al. |
| 2007/0260539 A1 | 11/2007 | Delinsky |
| 2007/0282736 A1 | 12/2007 | Conlin et al. |
| 2007/0288338 A1 | 12/2007 | Hoadley |
| 2007/0299770 A1 | 12/2007 | Delinsky |
| 2007/0299771 A1 | 12/2007 | Brody |
| 2008/0133322 A1 | 6/2008 | Kalia et al. |
| 2008/0140507 A1 | 6/2008 | Hamlisch et al. |
| 2008/0222015 A1 | 9/2008 | Megdal et al. |
| 2008/0270294 A1 | 10/2008 | Lent et al. |
| 2009/0063330 A1 | 3/2009 | Cerise |
| 2009/0144160 A1 | 6/2009 | Haggerty et al. |
| 2009/0144185 A1 | 6/2009 | Haggerty et al. |
| 2010/0009320 A1 | 1/2010 | Wilkelis |
| 2010/0145840 A1 | 6/2010 | Kasower |
| 2010/0223168 A1 | 9/2010 | Haggerty et al. |
| 2010/0299251 A1 | 11/2010 | Thomas |
| 2010/0299252 A1 | 11/2010 | Thomas |
| 2010/0299260 A1 | 11/2010 | Thomas |
| 2010/0324986 A1 | 12/2010 | Thomas |
| 2010/0325036 A1 | 12/2010 | Thomas |
| 2011/0004514 A1 | 1/2011 | Thomas |
| 2011/0004546 A1 | 1/2011 | Thomas |
| 2011/0029427 A1 | 2/2011 | Haggerty et al. |
| 2011/0060673 A1 | 3/2011 | Delinsky et al. |
| 2011/0112950 A1 | 5/2011 | Haggerty et al. |
| 2011/0166988 A1 | 7/2011 | Coulter |
| 2011/0295733 A1 | 12/2011 | Megdal et al. |
| 2012/0123931 A1 | 5/2012 | Megdal et al. |
| 2012/0265661 A1 | 10/2012 | Megdal et al. |

FOREIGN PATENT DOCUMENTS

| | | |
|---|---|---|
| EP | 1 028 401 | 8/2000 |
| JP | 2003-016261 | 1/2003 |
| WO | WO 00/11574 | 3/2000 |
| WO | WO 01/39589 | 6/2001 |
| WO | WO 01/41083 | 6/2001 |
| WO | WO 01/41355 | 6/2001 |
| WO | WO 01/57720 | 8/2001 |
| WO | WO 01/84281 | 11/2001 |
| WO | WO 2004/114160 | 12/2004 |
| WO | WO 2005/022348 | 3/2005 |
| WO | WO 2006/099492 | 9/2006 |
| WO | WO 2006/135451 | 12/2006 |

OTHER PUBLICATIONS

Credit Plus, Inc.; "Score Wizard" [online] [retrieved on Jun. 13, 2007] Retrieved from the internet http://web.archive.org/web/20030806080310/www.creditplus.com/scorewizard.asp Nov. 27, 2002 & Mar. 23, 2003.

CreditXpert, http://www.creditxpert.com/Products/individuals.asp printed Oct. 12, 2012 in 1 page.

CreditXpert Inc., CreditExpert 3-Bureau Comparison™, [online] [retrieved on Jun. 7, 2005] Retrieved from the Internet http://www.creditxpert.com/CreditXpert%203-Bureau%20Comparison(TM)%20sample.pdf , 2002.

CreditXpert Inc., CreditXpert Credit Score & Analysis, [online] [retrieved on Jun. 7, 2005] Retrieved from the internet http://www.creditxpert.com/CreditXpert%20Score%20&%20Analysis20and%20Credit%20Wizard%20sample.pdf , 2002.

CreditXpert Inc., CreditXpert Essentials™, Advisor View-Experian Jul. 7, 2003, [online] [retrieved on Nov. 29, 2004] Retrieved from the internet http://www.creditxpert.com/cx_ess_app.pdf , 2004., Issue Wallace.

CreditXpert Inc., CreditXpert Essentials™, Advisor View-TransUnion, [online] [retrieved on Jun. 7, 2005] Retrieved from the internet http://www.creditxpert.com/cx_ess_app.pdf, 2004., Issue Wallace.

CreditXpert Inc., CreditXpert Essentials™, Applicant View, [online] [retrieved on Jun. 7, 2005] Retrieved from the internet http://www.creditxpert.com/cx_ess_app.pdf, 2004.

CreditXpert Inc., CreditXpert What-If Simulator™, [online] [retrieved on Jun. 7, 2005] Retrieved from the Internet http://www.creditxpert.com/CreditXpert%20What-If%20Simulator(TM)%20sample.pdf, 2002.

Data Validation Tips and Techniques—zdnet.com Sep. 1, 1999.

Demby, Elayne, "Special Report: Letting Consumers Know the Score—and More", Collections and Credit Risk, New York, Feb. 2003, vol. 8, Issue 2, p. 53, 3 pgs.

"Equifax and FICO Serve Consumers", Mar. 2001.

Ettorre, Paul Kahn on Exceptional Marketing. Management Review, vol. 38(11), Nov. 1994, pp. 48-51.

Experian Announces PLUS Score; Experian Press Release dated Oct. 16, 2003; Experian Global Press Office.

Experian-Scorex Announces New Credit Simulation Tool, PR Newswire, Costa Mesa, CA, Jun. 13, 2005.

Fair Isaac Corporation, my FICO Sample FICO Score Simulator . . . .

Fair Isaac Corporation, myFICO: Calculators: Credit Assessment, [online] [retrieved on Jun. 8, 2005] Retrieved from the internet <URL: http://www.myfico.com/CreditEducation/Calculators/CreditAssessment.aspx, 2005.

Fair Isaac Corporation, myFICO: Help: FICO Score Simulator, [online] [retrieved on Jun. 8, 2005] Retrieved from the Internet http://www.myfico.com/Help/Simulator.aspx?fire=5, 2005.

Fair Isaac Corporation, myFICO: Products: Suze Orman's FICO Kit Platinum, [online] [retrieved on Jun. 8, 2005] Retrieved from the internet http://www.myfico.com/Products/FICOKit/Description.aspx, 2005.

Fair Isaac Corporation, myFICO: Products: Suze Orman's FICO® Kit Platinum: FICO Score Check, [online] [retrieved on Jun. 7, 2005] Retrieved from the internet http://www.myfico.com/Products/FICOKit/Sample03.html, 2005.

Fair Isaac Corporation, myFICO: Products: Suze Orman's FICO®. Kit Platinum: Look for Errors, [online] [retrieved on Jun. 7, 2005] Retrieved from the internet http://www.myfico.com/Products/FICOKit/Sample02.html, 2005.

Fair Isaac Corporation, myFICO: Products:Suze Orman's FICO® kit Platinum: Your FICO Score, [online] [retrieved on Jun. 7, 2005] Retrieved from the internet<http://www.myfico.com/Products/FICOKit/Sample01.html> 2005.

Fair Isaac Corporation, myFICO: Sample: FICO Score Simulator, [online] [retrieved on Jun. 8, 2005] Retrieved from the internet http://www.rnyfico.com/Content/Samples/Sample_ScoreSimulator.asp, 2005.

Fair Isaac Corporation, myFICO: Sample: FICO Score Simulator: "Max Out" Your Credit Cards, [online] [retrieved on Jun. 8, 2005] Retrieved from the internet http://www.myfico.com/Content/Samples/Sample_ScoreSimulatorResults.asp?Simulation=4&ReportID.

Fair Isaac Corporation, myFICO: Sample: FICO Score Simulator: Miss Payments, [online] [retrieved on Jun. 8, 2005] Retrieved from the internet http://www.myfico.com/Content/Samples/Sample_ScoreSimulatorResults.asp?miss_payment=radiobutton&Simulation=.

Fair Isaac Corporation, myFICO: Sample: FICO Score Simulator: Pay Down Delinquent Balances First, [online] [retrieved on Jun. 8, 2005] Retrieved from the internet http://www.myfico.com/Content/Samples/Sample_ScoreSimulatorResults.asp?textfieldCC=750.

Fair Isaac Corporation, myFICO: Sample: FICO Score Simulator: Pay Down the Balances on All Your Credit Cards, [online] [retrieved on Jun. 8, 2005] Retrieved from the internet http://www.myfico.com/Content/Samples/Sample_ScoreSimulatorResults.asp?tex.

(56) References Cited

OTHER PUBLICATIONS

Fair Isaac Corporation, myFICO: Sample: FICO Score Simulator: Pay Your Bills on Time. [online][retrieved on Jun. 8, 2005] Retrieved from the internet http://www.myfico.com/Content/Samples/Sample_ScoreSimulatorResults.asp?select1=1&Simulation=1&Repor.

Fair Isaac Corporation, myFICO: Sample: FICO Score Simulator: Seek New Credit, [online] [retrieved on Jun. 8, 2005] Retrieved from the internet http://www.myfico.com/Content/SamplesISample_ScoreSimulatorResults.asp?new_credit=radiobutton&textfield.

Fair Isaac Corporation, myFICO: Sample: FICO Score Simulator: Suggested Best Action, [online] [retrieved on Jun. 8, 2005] Retrieved from the internet http://www.myfico.com/Content/Samples/Sample_ScoreSimulatorResults.asp?Simulation=111&ReportID=1&Pr.

Fair Isaac Corporation, myFICO: Sample: FICO Score Simulator: Transfer Credit Card Balances, [online] [retrieved on Jun. 8, 2005] Retrieved from the internet http://www.myfico.com/Content/Samples/Sample_ScoreSimulatorResults.asp?textfield222=5000&Sim.

FICO Guide Service, Nov. 20, 2000, https://www.ficoguide.com/sample_report.cfm, 10 pages.

How Much Does a Low FICO Score Cost? Jul. 14, 2000, http://ficobuilder.com/kbsrch.htm, 2 pages.

Ideon, Credit-Card Registry that Bellyflopped this Year, Is Drawing some Bottom-Fishers, The Wall Street Journal, Aug. 21, 1995, pp. C2.

"Impac Funding Introduces Enhanced Website for Static Pool Tracking of MBS Transactions," Walthham, MA; Webpage printed out from http://www.lewtan.com/press/1208044_Impac-Lewtan.htm on Mar. 20, 2008.

Instant Access to Credit Reports Now Available Online with DMS' CreditBrowser-based system also Simplifies Credit Decisioning and Offers a Central Point of Control, Business Wire, p. 0264, Dallas, May 23, 2000.

"JPMorgan Worldwide Securities Services to Acquire Paloma's Middle and Back Office Operations," Webpage printed from http://www.jpmorgan.com on Apr. 1, 2009.

"Judging Credit: Consumers Need Better Finance Tools", News Journal, Daytona Beach, FL, Dec. 28, 2002.

Lee, W.A., "Experian Eyes Payments, Mulls Deals" American Banker: The Financial Services Daily, 2pgs., New York, NY, May 30, 2003.

Lee, W.A.; "Fair Isaac Taps Institutions for Credit Score Distribution", American Banker: The Financial Services Daily, New York, NY, Apr. 9, 2002, vol. 167, Issue 67, 1 Page.

Lee, W.A., "Money, Quicken, and the Value of Alliances", American Banker: The Financial Services Daily, 2pgs., New York, NY, Jul. 28, 2003.

Occasional CF Newsletter; http://www.halhems.com/index.cfm?fuseaction=newsletters.oct1999; Oct. 1999.

Overview, Aug. 7, 2000, file:///Windy%20Hillo/Desktop%20Folder/Fair%20Isacc%20explainer%20call%20Irene/CreditXpert%AA, 12 pages.

Powerforms: Declarative Client-Side for Field Validation, ISSN 1386-145x, Dec. 2000.

Singletary, Michelle "Ratings for the Credit Raters", The Washington Post, The Color of Money column, Mar. 24, 2002 in 1 page.

Singletary, Michelle, "Score One for Open Credit Ratings", The Washington Post, Washington DC, Jun. 18, 2000, 3 pages.

Stanton, T.H., "Credit Scoring and Loan Scoring as Tools for Improved Management of Federal Credit Programs", Financier, Philadelphia, Summer 1999, vol. 6, 36 pages.

Stein, Benchmarking Default Prediction Models: Pitfalls and Remedies in Model Validation, Moody's KMV, Revised Jun. 13, 2002, Technical Report #020305; New York.

Watts, Craig, "Consumers Now Can Know What Loan Rate Offers to Expect Based on Their FICO Credit Score at MyFICO.com", Mar. 6, 2002, http://www.myfico.com/PressRoom/PressReleases/2002_03_06.aspx.

Watts, Craig, "Fair, Isaac and Equifax Give Consumers New Score Power Tools Offering Greater Insights for Managing Their Credit Health", May 21, 2002, http://www.myfico.com/PressRoom/PressReleases/2002_05_21.aspx.

Webpage printed from http://www.magnum.net/pdfs/RapUpBrochure.pdf. On Mar. 4, 2008.

Your ficobuilder.com order is here! Jul. 3, 2000, 46 pages.

Yücesan et al., "Distributed web-based simulation experiments for optimization", Simulation Practice and Theory 9 (2001), pp. 73-90.

Zimmerman et al., "A web-based platform for experimental investigation of electric power auctions", Decision Support Systems 24 (1999), pp. 193-205.

Zoot—Instant Rules GUI, www.zootweb.com/instant_rules_GUI.html as printed Mar. 3, 2008.

Zoot—Rules Management GUI, www.zootweb.com/business_rules_GUI.html as printed Mar. 3, 2008.

Zoot—Zoot's Hosted Environment, http://www.zootweb.com/zootasp.html as printed Mar. 3, 2008.

International Preliminary Report on Patentability and Written Opinion for Application No. PCT/US2005/041814, dated Aug. 29, 2007.

Website.com
The tagline says it all

Tab 3 - Credit Simulations

Welcome <User Name>

| Credit At A Glance | Credit Summary | Credit Simulations | Compare My Score | Print Options |

Apply Changes

|  | Experian | Equifax | TransUnion |
|---|---|---|---|
| Positive Factors | ✓ No high balance to limit ratio on any revolving trades | ✓ No open bankcard trades reported within 6 months of the profile date | ✓ No high balance to limit ratio revolving trades |
|  | ✓ 2+ open bankcard trades reported within 6 months of the profile date | ✓ Current real-property trade | ✓ 2+ open bankcard trades requir within 6 months of the profile |
|  | ✓ Current real-property trade | ✓ | ✓ Current real-property trade |
|  | ✓ | ✓ | ✓ |
| Negative Factors | ✓ Presence of delinquency (present or past) on the | ✓ Presence of delinquency (present or past) on the | ✓ Presence of delinquency (present or past) on file |
|  | ✓ Overall high balance to find ratio on revolving trades | ✓ Overall high balance to find ratio on revolving trades | ✓ Overall high balance to find ratio on revolving trades |
|  | ✓ Too many inquiries for credit purposes | ✓ Too many inquiries for credit purposes | ✓ Too many inquiries for credit purposes |
|  | ✓ | ✓ | ✓ |

(3A)

Click on "Change" to refresh suggested actions

- Refresh
- Undo Last
- Start Over

Simulated Actions
- Returned all delinquent balances to "current" status
- Consolidated revolving account balances into Home Equity Line of credit account
- Removed 2 revolving account delinquencies (3G)

Suggested Actions
Upon evaluation of the information available, the following future actions are suggested:
☒ Return all delinquent balances to "current" status
☐ Consolidate Revolving Accounts into the open Home equity Line or Credit Account
(3B) Following these actions for 3 months will result in a positive change in your credit score of 64 points (EXPERIAN), 58 points (EQUIFAX), and 62 points (TRANSUNION)
Note: To take the above actions, the applicant must have $150 in available funds (3C1) Compare [Compare information across all credit bureaus] Update Risk Score (3C2)

(3C)
| Experian | Equifax | TransUnion |
|---|---|---|
| ☐ | Specific suggested action unique to Equifax bureau date | ☐ |

Standardize
Common Simulations
Money
☐ What is the best use of $ [    ] in available cash?
(3D)
☐ Pay down total collections debt by $ [    ] or [    ] %
☐ Pay down total collections debt by $ [    ] or [    ] %
☐ Pay down total collections debt by $ [    ] or [    ] %
☐ Pay down total collections debt by $ [    ] or [    ] %

Time
(3E) Pay minimum payments on all accounts and keep accounts current for 1 month(s)

New Credit
☐ Refinance an existing mortgage for a new amount of $ [    ]
☐ Shop for credit by applying for 1 other Auto loan(s)
(3F) Shop for credit by applying for 1 other Credit Card loan(s)
☐ Consolidate all revolving & installment balances into a new home equity line with
total credit limit of $ [    ] and additional balance of $ [    ]
☐ Open a new mortgage loan for $
☐ Apply for and receive a credit card limit increase of $

Original Score
| Exp | Eqx | TU |
|---|---|---|
| 640 | 632 | 639 |
(3H)

Simulated Score
| Exp | Eqx | TU |
|---|---|---|
| 718 | 700 | 705 |
(3I)

Differential Score
| Exp | Eqx | TU |
|---|---|---|
| +78 | +68 | +66 |
(3J)

Simulate

FIG. 20A

○ Website.com  
The tagline says it all

Tab 3 - Credit Simulations

Welcome <User Name>

| Credit At A Glance | Credit Summary | Credit Simulations | Compare My Score | Print Options |

Other
Negative Behavior
☐ File for Bankruptcy
☐ Miss 1 payment on all accounts
(3K) ☐ Receive a notice for credit card limit decrease by $ [    ]
☐ Max out all revolving credit cards
☐ Increase total balance on existing credit cards by $ [    ]

Information Only
(3L) ☐ Remove all public record items
☐ Remove all past and present delinquencies Account Detail
CBUSA                                                                                    Legend

| | EXPERIAN | EQUIFAX | TRANSUNION | Click in area below to change all values |
|---|---|---|---|---|
| Account Name: | CBUSA | CBUSA | CBUSA | |
| Account Number: | xxxx | xxxx | xxxx | |
| Account Type: | Revolving Charge Acct. | Revolving Charge Acct. | Revolving Charge Acct. | |
| Account Status: | Open | Open | Open | |
| Monthly Payment: | $45.00 | $45.00 | $45.00 | |
| Date Open: | 7/1/2000 | 7/1/2000 | 7/1/2000 | |
| Balance: | $2,000.00 | $2,000.00 | $2,000.00 | |
| Terms: | Revolving | Revolving | Revolving | |
| High Balance: | | | | |
| Limit: | $3,000.00 | $3,000.00 | $3,000.00 | |
| Past Due: | $150.00 | $150.00 | $150.00 | |
| Payment Status: | Delinquent | Delinquent | Delinquent | |
| Comments: | | | | |

(3M) marks the Balance row region.

24 Month Payment History                                 Click on item to simulate value changes      Future

| Date: | Feb 03 | Mar 03 | Apr 03 | May 03 | Jun 03 | Jul 03 | Aug 03 | Sep 03 | Oct 03 | Nov 03 | Dec 03 | Jan 04 | Feb 04 | Mar 04 | Apr 04 | May 04 | Jun 04 | Jul 04 | Aug 04 | Sep 04 | Oct 04 | Nov 04 | Dec 04 | Jan 05 | Feb 05 | Mar 05 | Apr 05 | May 05 | Jun 05 |
|---|---|---|---|---|---|---|---|---|---|---|---|---|---|---|---|---|---|---|---|---|---|---|---|---|---|---|---|---|---|
| Experian | OK | OK | OK | OK | OK | OK | OK | OK | OK | OK | OK | OK | OK | OK | OK | OK | OK | OK | OK | OK | OK | OK | OK | OK | OK | OK | OK | OK | OK |
| Equifax | OK | OK | OK | OK | OK | OK | OK | OK | OK | OK | OK | OK | OK | OK | OK | OK | OK | OK | OK | OK | OK | OK | OK | OK | OK | OK | OK | OK | OK |
| TransUnion | OK | OK | OK | OK | OK | OK | OK | OK | OK | OK | OK | OK | OK | OK | OK | OK | OK | OK | OK | OK | OK | OK | OK | OK | OK | OK | OK | OK | OK |

(3N)

FIG. 20B experian®
SCOREX

| Credit at a Glance | Credit Summary | Credit Simulations | score comparison | print options |

Welcome ERES

Original Scorex PLUS Score

| Experian | Equifax | TransUnion |
|---|---|---|
| 542 | 540 | 535 |

Below are the positive and negative factors affecting the credit score

Positive Factors | ⓘ

| Experian | Equifax | TransUnion |
|---|---|---|
| Number of recent credit inquiries | Number of recent credit inquiries | Number of recent credit inquiries |
| Bankcard Accounts are current within the last 12 months | Bankcard Accounts are current within the last 12 months | Bankcard Accounts are current within the last 12 months |
| Number of accounts recently delinquent or derogatory | Number of accounts recently delinquent or derogatory | Number of accounts recently delinquent or derogatory |

Negative Factors | ⓘ

| | | |
|---|---|---|
| Percentage of Accounts that are presently delinquent or derogatory | Percentage of Accounts that are presently delinquent or derogatory | Percentage of Accounts that are presently delinquent or derogatory |
| Total available credit on all open revolving accounts reported within the last 6 months | Total available credit on all open revolving accounts reported within the last 6 months | Total available credit on all open revolving accounts reported within the last 6 months |
| Number of revolving or bankcard accounts with high balance to limit ratio | Number of revolving or bankcard accounts with high balance to limit ratio | Number of revolving or bankcard accounts with high balance to limit ratio |
| Percentage of account that are presently delinquent or derogatory | Percentage of account that are presently delinquent or derogatory | Percentage of account that are presently delinquent or derogatory |
| Average age of all accounts | Average age of all accounts | Average age of all accounts |

All Accounts

| Experian | Equifax | TransUnion |
|---|---|---|

©Experian 2005. | All Rights Reserved.

FIG. 21A experian® SCOREX

Welcome ERES

| Credit at a Glance | Credit Summary | Credit Simulations | score comparison | print options |

Positive Factors
- Number of recent credit inquiries
- Bankcard Accounts are current within the last 12 months
- Number of accounts recently delinquent or derogatory
- Percentage of Accounts that are presently delinquent or derogatory
- Total available credit on all open revolving accounts reported within the last 6 months
- Number of revolving or bankcard accounts with high balance to limit ratio
- Percentage of account that are presently delinquent or derogatory
- Average age of all accounts

Negative Factors
- Number of recent credit inquiries
- Bankcard Accounts are current within the last 12 months
- Number of accounts recently delinquent or derogatory
- Percentage of Accounts that are presently delinquent or derogatory
- Total available credit on all open revolving accounts reported within the last 6 months
- Number of revolving or bankcard accounts with high balance to limit ratio
- Percentage of account that are presently delinquent or derogatory
- Average age of all accounts

| All Accounts | Experian | Equifax | TransUnion |
| --- | --- | --- | --- |
| Count | 6 | 6 | 3 |
| Balance | $3,405.00 | $2,788.00 | $2,772.00 |
| Current | 4 | 4 | 2 |
| Delinquent | 0 | 1 | 0 |
| Other | 2 | 1 | 1 |

©Experian 2005. | All Rights Reserved.

FIG. 21B

Website.com
The tagline says it all

Tab 1 - Credit at a Glance

Welcome <User Name>

| Credit At A Glance | Credit Summary | Credit Simulations | Compare My Score | Print Options |

1A

| Credit Bureau Used | |
|---|---|
| Original Scorex PLUS Score | 669 |

Below are the positive and negative factors affecting your credit score.

1B

| | | Experian | | Equifax | | TransUnion |
|---|---|---|---|---|---|---|
| Positive Factors | ✓ | No high balance to limit ratio on any revolving trades | ✓ | 2+ open bankcard trades reported within 6 months of the profile date | ✓ | No high balance to limit ratio on any revolving trades |
| | ✓ | 2+ open bankcard trades reported within 6 months of the profile date | ✓ | Current real-property trade | ✓ | 2+ open bankcard trades reported within 6 months of the profile date |
| | ✓ | Current real-property trade | | | ✓ | Current real-property trade |
| | ✓ | | ✓ | | ✓ | |
| Negative Factors | ✓ | Presence of delinquency (present or past) on file | ✓ | Presence of delinquency (present or past) on file | ✓ | Presence of delinquency (present or past) on file |
| | ✓ | Overall high balance to limit ratio on revolving trades | ✓ | Overall high balance to limit ratio on revolving trades | ✓ | Overall high balance to limit ratio on revolving trades |
| | ✓ | Too many inquiries for credit purposes | ✓ | Too many inquiries for credit purposes | ✓ | Too many inquiries for credit purposes |
| | ✓ | | ✓ | | ✓ | |

1C

| All Accounts | Experian | Equifax | TransUnion |
|---|---|---|---|
| Count: | 9 | 9 | 9 |
| Balance: | $64.00 | $216.00 | $216.00 |
| Current: | 9 | 9 | 9 |
| Delinquent: | 0 | 0 | 0 |
| Other: | 0 | 0 | 0 |

FIG. 21C experian® SCOREX

Welcome ERES

| Credit at a Glance | Credit Summary | Credit Simulations | score comparison | print options |

Personal Profile

| | Experian | Equifax | TransUnion |
|---|---|---|---|
| Name: | ASHLEY S CARTER | CARTER ASHLEY | ASHLEY CARTER |
| Also Know As: | | | |
| Year of Birth: | 1975 | 09/08/1975 | 1975/09/01 |
| Current Address: | 222 S AUSTRALIAN AVE STE 1111 WEST PALM BEACH FL 334015014 | 111 PARK RD N ROYAL PALM BEACH FL 33411 | 222 S AUSTRALIAN AVE STE 1111 WEST PALM BEACH FL 334015014 |
| Previous Address: | 111 PARK RD N ROYAL PALM BEACH FL 334111563 | 222 S AUSTRALIAN AVE STE 1111 WEST PALM BEACH FL 33401 | 111 PARK ROYAL PALM BEACH FL 33411 |

Account Summary

▼ REVOLVING BANK CARD

| | Experian | Equifax | TransUnion |
|---|---|---|---|
| Count: | 2 | 2 | 2 |
| Balance: | $2,022.00 | $1,525.00 | $2,022.00 |
| Current: | 1 | 1 | |

©Experian 2005. | All Rights Reserved.

Website.com
The tagline says it all

Tab 2 - Credit Summary

Welcome <User Name>

| Credit At A Glance | Credit Summary | Credit Simulations | Compare My Score | Print Options |

②A

Personal Profile
Here you will find the personal information contained in your credit file, including your legal name(s), current and previous addresses, current and previous employers, and date of birth.

|  | EXPERIAN | EQUIFAX | TRANSUNION |
|---|---|---|---|
| Name | JOHN CONSUMER | JOHN M CONSUMER | JOHN M CONSUMER |
|  | JOHN CONSUMER | N/A | CONSUMER JOHN |
| Year of Birth | 1976 | 1976 | 1976 |
| Previous Address(es) | 1000 Westminster Garden Grove CA 92620 | 1000 Westminster Garden Grove CA 92620 | 1000 Westminster Garden Grove CA 92620 |
|  | 1001 Newhope Way Santa Ana CA 92707 |  |  |
| Previous Employer(s) | CONSUMERINFO.COM | | TIME WARNER |
|  | IPLACE.COM | N/A | N/A |

②B

Account Summary
This section gives you a broad look at your current and past credit status. Here you'll find the total number of open and closed accounts in your name, the total balance on those accounts, and delinquencies.

|  | EXPERIAN | EQUIFAX | TRANSUNION |
|---|---|---|---|
| REAL ESTATE | | | |
| Count: | 0 | 0 | 0 |
| Balance: | $0.00 | $0.00 | $0.00 |
| Current: | 0 | 0 | 0 |
| Delinquent: | 0 | 0 | 0 |
| Other: | 0 | 0 | 0 |
| REVOLVING | | | |
| Count: | 9 | 3 | 3 |
| Balance: | $64.00 | $216.00 | $216.00 |
| Current: | 9 | 9 | 9 |
| Delinquent: | 0 | 0 | 0 |
| Other: | 0 | 0 | 0 |
| INSTALLMENT | | | |
| Count: | 0 | 0 | 0 |
| Balance: | $0.00 | $0.00 | $0.00 |
| Current: | 0 | 0 | 0 |
| Delinquent: | 0 | 0 | 0 |
| Other: | 0 | 0 | 0 |
| OTHER | | | |
| Count: | 0 | 0 | 0 |
| Balance: | $0.00 | $0.00 | $0.00 |
| Current: | 0 | 0 | 0 |
| Delinquent: | 0 | 0 | 0 |
| Other: | 0 | 0 | 0 |
| COLLECTION | | | |
| Count: | 0 | 0 | 0 |
| Balance: | $0.00 | $0.00 | $0.00 |
| Current: | 0 | 0 | 0 |
| Delinquent: | 0 | 0 | 0 |
| Other: | 0 | 0 | 0 |
| ALL | | | |
| Count: | 9 | 9 | 9 |
| Balance: | $64.00 | $216.00 | $216.00 |
| Current: | 9 | 9 | 9 |
| Delinquent: | 0 | 0 | 0 |
| Other: | 0 | 0 | 0 |

FIG. 22E

○ Website.com
The tagline says it all

Tab 2 - Credit Summary

Welcome \<User Name\>

| Credit At A Glance | Credit Summary | Credit Simulations | Compare My Score | Print Options |

2C

Public Records
The information in this section comes from federal district bankruptcy records, state and county court records, tax liens and monetary judgements, and in some states, overdue child support records.
Public records remain on your credit report for 7-10 years.

| | EXPERIAN | EQUIFAX | TRANSUNION |
|---|---|---|---|
| Type: | | | |
| Date Filed: | 12-Jan-98 | | |
| Reference #: | A6874800 | | |
| Court: | US District Court | | |
| Plaintiff: | Dianna Whiller | | |
| Liability: | N/A | | |
| Asset amount: | N/A | | |
| Type: | BK Chapter 13 Filed | BK Chapter 13 Filed | BK Chapter 13 Filed |
| Date Filed: | 19-Jun-97 | 19-Jun-97 | 19-Jun-97 |
| Reference #: | A9874577 | A9874578 | A9874579 |
| Court: | US District Court | US District Court | US District Court |
| Plaintiff: | N/A | Wilson Sports Wear | Park Line Hotel |
| Liability: | $4,756 | 25,000 | $50,000 |
| Asset amount: | $7,500 | 25,600 | $20,600 |

2D

Credit Inquiries
This section contains the names of those who obtained a copy of your credit report.
Inquiries remain on your report up to two years.

| | EXPERIAN | EQUIFAX | TRANSUNION |
|---|---|---|---|
| Wells Fargo Bank: Bank: 1/1/2005 | ✓ | | |
| Sanana Republic Retailer 12/13/2003 | | ✓ | |
| Robinson's May General Clothing Store 5/7/2002 | | | ✓ |
| Discount Tires Auto Shop 6/13/2001 | | ✓ | |

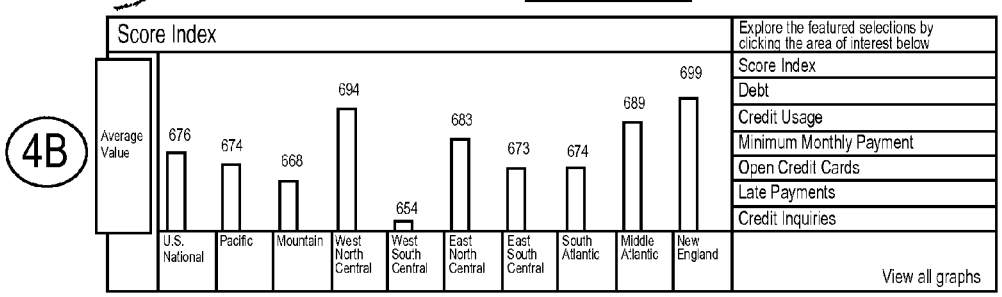
FIG. 23L

CREDIT SCORE SIMULATION

This patent application is related to the following patent application, which is hereby incorporated by reference: U.S. patent application Ser. No. 10/452,155, filed on May 30, 2003, entitled "System and Method for Interactively Simulating a Credit-Worthiness Score." The priority chain of this application is set forth in one or more Application Data Sheets filed in connection with this application.

FIELD OF THE INVENTION

This invention relates generally to simulating a credit score and, more specifically, to determining how modifying credit data can affect a credit score.

BACKGROUND OF THE INVENTION

Credit analysis determines a numerical score that represents an amount of credit-worthiness (or credit risk) associated with an individual or a group. Businesses and financial institutions, among others, use this credit score to determine whether credit should be offered or granted, and at what terms, to the individual or group in question.

A credit score is determined based on several types of information, which is collectively called "credit data." Credit data can include, for example, personal information (such as a value of a major asset), credit information (such as account balance), public record information (such as bankruptcy), and inquiry information (such as a request for a credit report). Each piece of credit data has a value, and this value can affect the credit score.

Since credit scores are important, it makes sense that a person would want to know how taking a particular action (such as increasing or decreasing an account balance) could affect her credit score. Unfortunately, it is very difficult to determine this by merely analyzing a set of credit data and its resulting credit score. Credit data is fed into an algorithm (called a risk model or "scorecard"), which analyzes the data and determines a credit score. Scorecards are generally kept secret, and it is nearly impossible to reverse-engineer them because they are so complex.

What is needed are a method and a system that can generate a first credit score, enable the credit data to be modified, and generate a second credit score. This will demonstrate how changes in credit data affect the credit score.

SUMMARY OF THE INVENTION

Systems and methods are described that simulate a credit score. That is, a first credit score is determined based on a first set of credit data, the first set of credit data is modified to form a second set of credit data, and a second credit score is determined based on the second set of credit data. The difference between the first and second scores, if any, is due to the difference between the first and second set of credit data. Credit data can include, for example, personal information, tradeline information, public record information, and inquiry information. A piece of credit data has a value, and this value can affect the credit score. A credit data element can be modified in real-life by performing an action, such as paying off a credit card balance or filing for bankruptcy.

In one embodiment, the system enables a user to modify a credit data element in order to determine its effect on a credit score. The user can modify the element directly or simulate an action that, if performed, would modify the element. Since the number of possible modifications and actions can be overwhelming, in one embodiment, the system suggests modifications and actions to be simulated. These suggestions can be tailored to a user's goal, such as increasing a credit score by a particular number of points or allocating a particular sum of money in order to maximize a credit score.

In one embodiment, the system includes a control module, a scenario module, a score module, a simulation options module, a presentation module, and a storage module. The modules can be located in a single device or be divided among multiple devices. In one embodiment, the system obtains credit data from one data repository, such as a credit bureau. In another embodiment, the system obtains credit data from multiple data repositories. In one embodiment, each credit score is determined using the same algorithm. In another embodiment, credit scores can be determined using different algorithms, such as the different algorithms used by the different credit bureaus.

BRIEF DESCRIPTION OF THE FIGURES

FIG. 10 is the user interface of FIG. 9, except that the window has been scrolled down to expose a different area.

FIG. 11 is a user interface that shows simulation options, a second fully expanded Account Detail area, and an expanded Experian account status pull-down menu, according to one embodiment of the invention.

FIG. 12 is a user interface that shows simulation options, a second fully expanded Account Detail area, and an expanded Experian present status pull-down menu, according to one embodiment of the invention.

FIG. 13 is a user interface that shows simulation options, a second fully expanded Account Detail area, and an expanded "Change on all" present status pull-down menu, according to one embodiment of the invention.

FIG. 14 is a user interface that shows simulation options and an expanded Tri-Bureau Comparison area, according to one embodiment of the invention.

FIG. 19 is a user interface that shows simulation options and a Common Simulations area with simulation options based on a specified point value, according to one embodiment of the invention.

FIGS. 20A-B are user interfaces that show simulation options, according to one embodiment of the invention.

FIGS. 21A-C are user interfaces that show the credit at a glance topic, according to multiple embodiments of the invention.

Figure 22B:
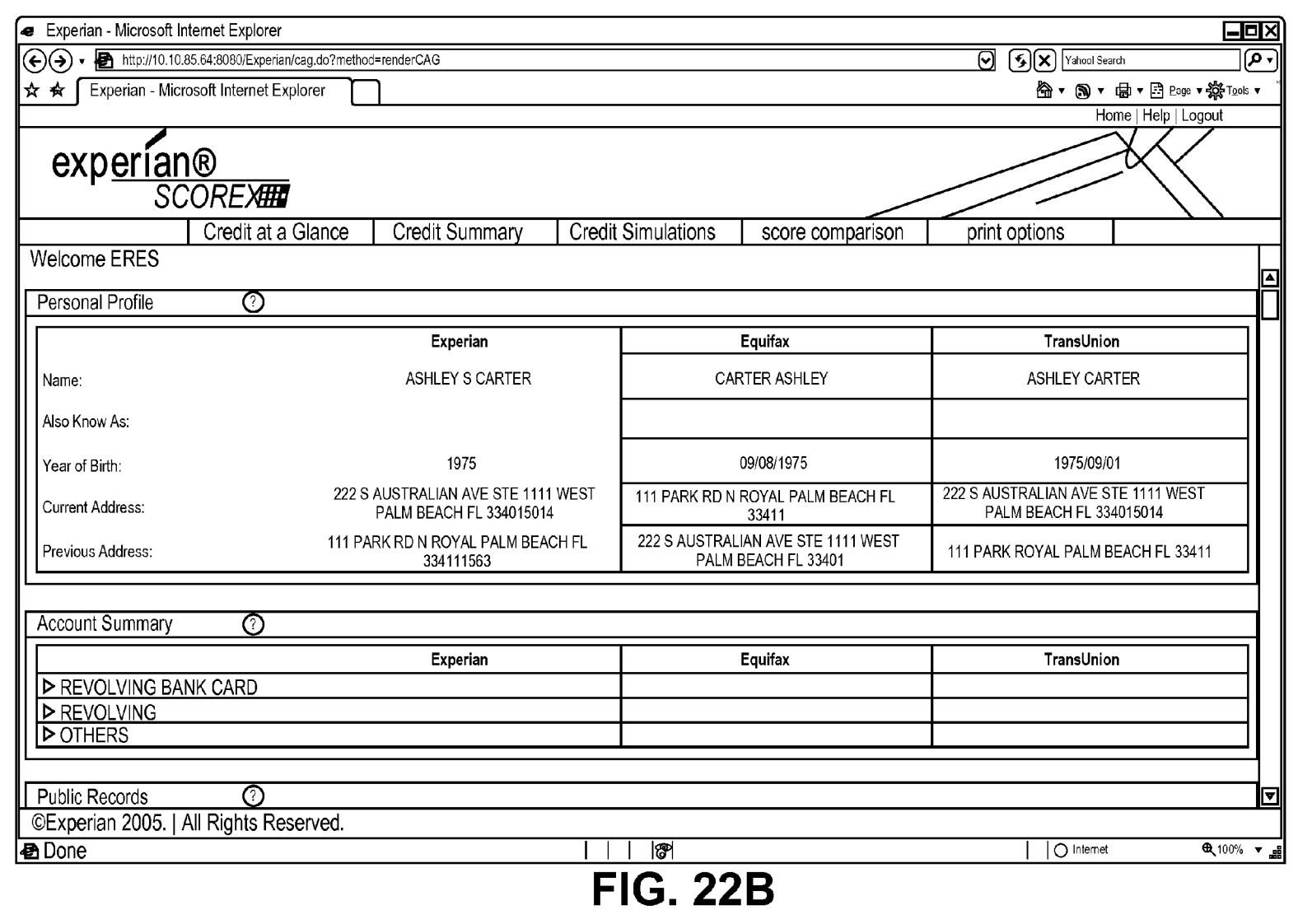

FIGS. 22A-F are user interfaces that show the credit summary topic, according to multiple embodiments of the invention.

Figure 23A:
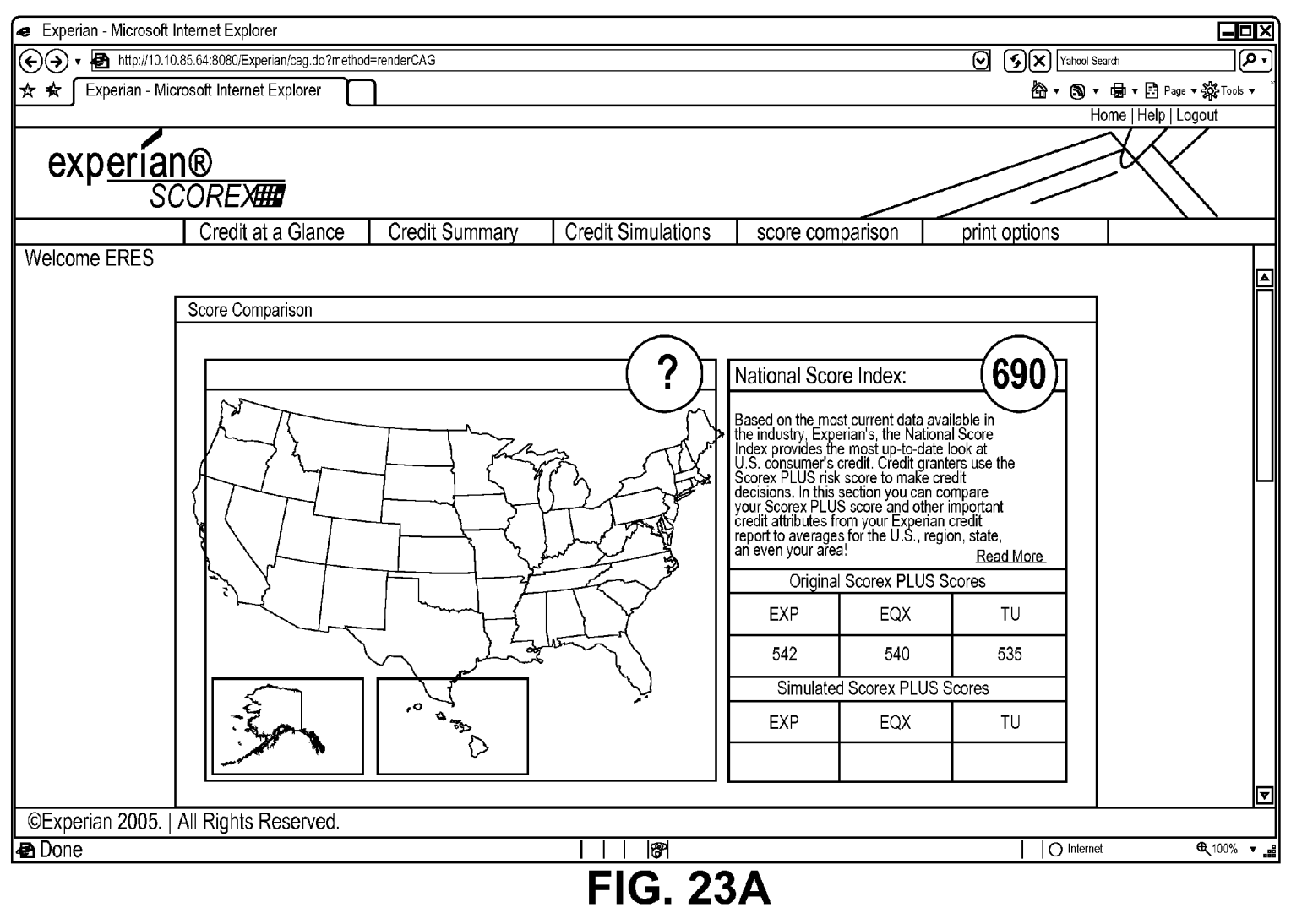

FIGS. 23A-L are user interfaces that show the score comparison topic, according to multiple embodiments of the invention.

Figure 1:
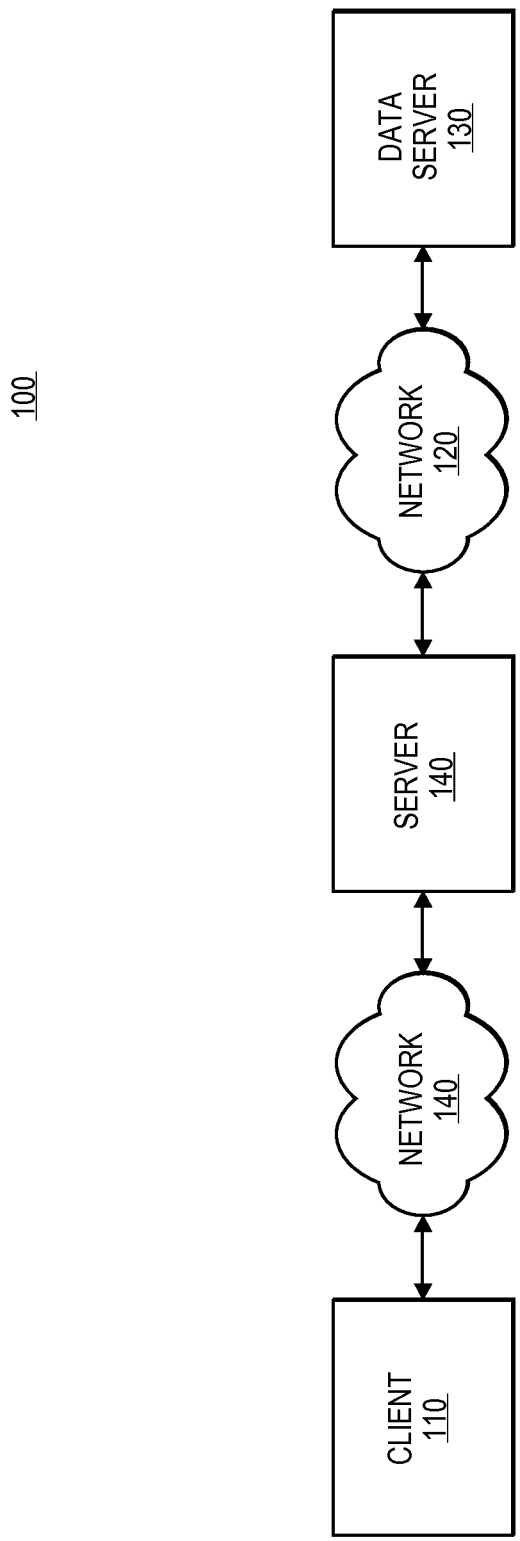
FIG. 1 is a block diagram of a credit score simulation system, according to one embodiment of the invention.

The figures depict embodiments of the present invention for purposes of illustration only. One skilled in the art will readily recognize from the following discussion that alternative embodiments of the structures and methods illustrated herein can be employed without departing from the principles of the invention described herein.

DETAILED DESCRIPTIONS OF THE EMBODIMENTS

Many industries and fields are concerned with predicting the future based on information regarding the past and the present. For example, the loan industry wants to predict future financial behaviors (such as delinquency, bankruptcy, and profitability) based on past and current financial behaviors.

One way to express a prediction is by using a numerical score. This score can represent a likelihood that a particular phenomenon will occur in the future. The score can be determined based on input data (representing information about past and current phenomena) and an algorithm. In the loan industry, these scores are known as "financial risk scores." One example of a financial risk score is a credit-worthiness score ("credit score").

The embodiments described below address financial risk scores and, in particular, credit scores. However, the invention can be used in conjunction with any predictive system that generates scores. These predictive systems can address such diverse topics as, for example, stock prices, weather patterns, and systems failures.

While the invention can be used in conjunction with any financial risk score, the embodiments described below address credit scores in particular. Specifically, systems and methods for determining a credit score that is based on modified credit data are described.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages can be used to implement the teachings of the invention as described herein.

Overview

As discussed above, a credit-worthiness score ("credit score") is determined based on credit data. Credit data can include, for example, personal information, tradeline information, public record information, and inquiry information. Personal information can include, for example, birth date, a value of a major asset (such as a home), and job information (e.g., employment history, including salary and employer).

A tradeline is a line of credit, such as a credit card, retail account, installment loan, mortgage, or consumer finance account. Tradeline information can include, for example, type (e.g., revolving or installment), credit limit, date opened, chargeoffs, and payment history, including balance and whether or not the balance is past due (and, if so, how long and the amount of money involved).

Public record information can include, for example, bankruptcies, judgments, lawsuits, liens, and wage attachments. Inquiry information can include, for example, when a credit report was requested and by whom. Other types of credit data elements can include, for example, collection accounts.

Each piece of credit data has a value, and this value can affect the credit score. One way to determine the effect of a credit data element is to determine a first credit score using a first value of the element and a second credit score using a second value of the element (with all or most of the other credit data elements remaining unchanged). While the credit data used can be hypothetical (e.g., based on local or national averages or chosen at random), it is particularly useful when the credit data belongs to an actual person. And while the credit data element to be modified can be any credit data element, it is useful when the modification reflects a change that can be accomplished in real-life.

For example, a person might wonder "What if my credit card balance was zero? What would happen to my credit score?" A first credit score will be determined using the person's actual credit data. Then, the credit card balance will be changed to zero, and a second ("simulated") credit score will be determined. The difference between the two credit scores is due to the credit card balance being set to zero.

A credit data element modification is brought about in real-life by performing an action. For example, a credit card balance can be set to zero by paying off the credit card. Thus, in the previous example, the difference between the two credit scores is due to having paid off the credit card. Similarly, a credit card balance can be increased by charging money to the card.

There are several different types of credit data elements, and modifications in their values can be brought about by a variety of actions. For example, personal information can be changed by buying or selling a house or by switching jobs. Tradeline information can be changed by, for example, opening an account, closing an account, making a payment, making a charge, or obtaining a different credit limit. Public record information can be changed by, for example, filing for bankruptcy or having a record expunged.

Also, each of these actions can have different characteristics that affect the underlying credit data element in a different way (or even not affect it at all). For example, charging money to a credit card affects the balance. But the "charging" action can vary in terms of how much money was charged and to which credit card. Similarly, opening an account creates a new tradeline. But the "opening" action can vary in terms of what type of account is opened and what its initial balance is.

The timing of the action can also matter. For example, paying off a credit card immediately versus paying it off in six months can result in two different credit scores. Similarly, paying off a first credit card and then paying off a second credit card can result in a different score than paying off the second credit card and then paying off the first.

In other words, a progression from one credit score to the next reflects the effect of a scenario. If the scenario occurs (e.g., if particular credit data elements are modified in particular ways at particular times), then the credit score will change from the first value to the second value.

Simulated credit scores can also be used to answer more complex questions. For example, imagine that a person wants to pay off his debts. Ideally, he would pay off all of his debts at once. But suppose he doesn't have enough money to do this. He wants to know how to allocate his money (e.g., which debts to pay down first, and in what amount) in order to maximize his credit score.

This situation can be represented by the following question: "If I have $x in cash, how should I allocate it in order to maximize my credit score?" One way to answer this question is to generate several scenarios, where the credit data elements in each scenario reflect that up to $x has been allocated (e.g., to pay down one or more tradelines). A simulated score would then be determined for each scenario. The scenario with the highest simulated score would indicate how $x (or up to $x) should be allocated in order to maximize the credit score.

For example, assume that a person has two credit cards (A and B) and a mortgage, each of which has a balance greater than $x. The following scenarios can be generated:

a) The balance on A is reduced by $x, and all other credit data elements are unchanged. (This scenario reflects using $x to pay down card A.)
b) The balance on B is reduced by $x, and all other credit data elements are unchanged. (This scenario reflects using $x to pay down card B.)
c) The balance on the mortgage is reduced by $x, and all other credit data elements are unchanged. (This choice reflects using $x to pay down the mortgage.)
d) The balance on A is reduced by $(x)(⅓), the balance on B is reduced by $(x)(⅓), the balance on the mortgage is reduced by $(x)(⅓), and all other credit data elements are unchanged. (This choice reflects using $x to pay down card A, card B, and the mortgage in equal amounts.)

The scenarios outlined above are only a few of the nearly infinite number of scenarios possible. For example, while each scenario above allocates $x in total, other scenarios are possible where less than $x is allocated in total. As another example, while the fourth scenario above allocates money in equal amounts to the three tradelines, other scenarios are possible where the money is allocated unequally among the tradelines (and possibly allocated to only two tradelines instead of three). As yet another example, while the scenarios above do not address timing, other scenarios are possible where the timing of the actions can differ, either in terms of on what date an action is performed or in terms of ordering between actions (e.g., which action is performed first and which action is performed second). A simulated credit score can be determined for each of these other scenarios.

Another complex question that can be answered by using simulated credit scores arises in the following situation: Imagine that a person wants to increase his credit score, but he doesn't know how. This situation can be represented by the following question: "What actions can I take to increase my credit score?" or, more specifically, "Which credit data elements should be modified (and by how much) to increase my credit score?" One way to answer this question is to generate several scenarios, where the credit data elements reflect real-life, except that one or more of them have been modified (i.e., one or more actions have been taken). For example, a balance has been paid down, a credit limit has been increased, and/or a new type of tradeline has been opened. Each scenario represents an action (or a set of actions) that, once performed, might increase the credit score. The simulated score is determined for each scenario, and the scenarios whose simulated scores are greater than the original score are identified. The person can then choose a scenario and carry it out. For example, the person might choose the scenario with the highest simulated score or the scenario whose actions require the least amount of money in order to be performed.

A related question is "Which x actions (or x sets of actions) will increase my credit score the most?" or, more specifically, "Which x credit data elements (or x sets of credit data elements) should be modified (and by how much) to increase my credit score the most?" In this situation, after the simulated score has been determined for each scenario, the x scenarios with the highest score increases are determined. (Note that since the scenarios are all being compared to the same starting score, the scenarios with the highest score increases are also the scenarios with the highest simulated scores.)

As yet another example, imagine that a person has applied for a mortgage. His actual credit score does not satisfy the mortgage lender's credit risk policy, so the application would normally be denied. This denial would hurt not only the applicant, but also the lender, since it would lose a potential customer. If the actual credit score comes close to satisfying the policy, then it is possible that the person can perform one or more actions in order to increase his score and thereby satisfy the policy.

This situation can be represented by the following question: "What actions (or sets of actions), once performed, would increase my credit score by x points?" This question is similar to the previous question, namely, "Which x actions (or sets of actions) will increase my credit score the most?" Here, however, the scenarios must increase the credit score by x (or more) points in order to be considered. (Of course, an increase of x or more points may be impossible, no matter what actions are performed.)

Answering these complex questions includes generating scenarios, determining a simulated score for each scenario, and analyzing the scores. While these steps are relatively straightforward, the quantity becomes unmanageable in practice. This is because the sheer number of credit data elements, along with their possible modifications (and when these modifications can occur), result in hundreds, thousands, or even millions of possible scenarios. Generating all of these scenarios and determining their associated scores would take an extremely long time.

An option is to decrease the number of scenarios that are generated and whose simulated scores are determined. The complex question would then be answered based on the available data. While it's unlikely that this abbreviated approach will return the same answer as the full-blown approach, the answer should be close enough to be useful. For example, the answer may not be "the best (i.e., ideal) way to allocate up to $x in order to maximize a credit score," but it will be sufficiently close for the user.

One way to decrease the number of scenarios is to choose them randomly from the set of all possible scenarios. However, this approach can lead to an answer that is far from the "true" answer. A better way is to choose which scenarios to simulate so that the sample set (the chosen scenarios) is representative of the entire search space. Consider the example of allocating up to $x. The universe of possible scenarios includes paying down each tradeline in an amount from $0 to $x (and, if less than $x, possibly using the remaining money to pay down additional tradelines). One way to decrease the number of scenarios is to search this universe in a structured way. In particular, scenarios can be chosen that exist in different parts of the search space.

For example, credit scores can be determined for the following scenarios: allocating $x to tradeline 1; allocating $x to tradeline 2; . . . ; allocating $x to tradeline N; and allocating $(x)(1/N) to each tradeline (1 to N). These scores indicate how attractive various portions of the search space are and can thus be used to determine which scenarios to try next. Then, those results can determine which scenarios to try next, and so on. (Credit scores can also be determined for scenarios that vary in terms of when money is allocated and/or in what order.)

Yet another way to decrease the number of scenarios is to leverage knowledge of the scoring algorithm. For example, a scoring algorithm might round off each tradeline balance to the nearest $5. In this situation, a $106 balance will be rounded off to $105. Thus, it is irrelevant (to the credit score) whether the balance is actually $106 or $105. If one scenario creates a $106 balance and another creates a $105 balance, then both scenarios will yield the same credit score (assuming, of course, that the rest of the credit data elements are equal). Since both scenarios will yield the same credit score, it is unnecessary to determine credit scores for each scenario.

As another example, a scoring algorithm might weight a first credit data element more heavily than a second credit data element. This means that changes in the first credit data element will affect the credit score more than changes in the second credit data element. Thus, it might make more sense to process scenarios that vary the first credit data element before processing scenarios that vary the second credit data element. An extreme example of this is when the scoring algorithm completely ignores a credit data element. In this situation, scenarios that differ with respect to only that credit data element would all yield the same credit score and thus are redundant.

While increasing the number of iterations generally returns an answer that is closer to the "true" answer, it also takes more time. This time can be important if the user is impatiently waiting for the answer. On the other hand, the user might want a better answer no matter how long it takes. In one embodiment, a threshold is used to determine when to stop the iterations and return an answer based on the credit scores determined so far. The threshold value can be set according to the user's goals (e.g., a quicker answer versus a more correct, but slower answer). The threshold can measure, for example, how many credit scores have been determined, how many iterations have been performed, how representative the sample set is of the entire search space, and how useful (or how close to the truth) the current answer would be.

System

In one embodiment, a credit score simulation system 100 determines a credit score that is based on modified credit data. A scenario (e.g., a set of credit data elements and their values) can be input in various ways, such as by using a variety of user interface elements or by specifying a file. In the former embodiment, a user can interact with the simulation system 100, while in the latter embodiment, the simulation system 100 can operate independently of the user. In other words, the simulation system 100 can be run in "interactive" mode or in "batch" mode.

Batch mode can be useful, for example, when a business or financial institution is dealing with dozens, hundreds, or thousands of people. For example, a collection agency wants to tell its debtors that their debts are hurting their credit scores. The collection agency can request that each person's credit score be simulated as if the debt were paid off. The agency can then tell each debtor the difference between the simulated score and the actual score, in an attempt to convince her to pay off her debt. The requested simulations can be run in batch mode.

An interactive simulation system 100 includes a plurality of modules, which are discussed below with reference to FIG.

2. In one embodiment, the modules are located in a single device. This device can be, for example, a laptop computer, a desktop computer, a server, a handheld device, a Personal Digital Assistant (PDA), a wireless phone, or any other type of general-purpose computing apparatus or specialized computer apparatus. Together, the modules can form, for example, a standalone application or a web browser plug-in.

In another embodiment, the modules are divided among a plurality of devices. For example, the storage module 250 (discussed below) can be located in a separate device, such as a data server that contains a database or other type of data repository. As another example, some modules can be located in a client, while other modules can be located in a server. In one embodiment, most of the modules are located in the server, and the client is therefore a "thin" client.

FIG. 1 is a block diagram of a credit score simulation system, according to one embodiment of the invention. In the illustrated embodiment, simulation system 100 includes a client 110, a server 120, a data server 130, and a communications network 140. The client 110 can be, for example, a general-purpose computer capable of running a web browser or other user-interface program or a limited-function electronic device configured to communicate with the server 120. The server 120 can be, for example, a general-purpose computer configured to serve web pages or otherwise communicate with the client 110. The data server 130 can be, for example, a general-purpose computer configured to store data and provide remote access to the data.

The client 110 and the data server 130 are communicatively coupled to the server 120. These connections can be wired and/or wireless. In the illustrated embodiment, the client 110 and the data server 130 are communicatively coupled to the server 120 via a communications network 140. The network 140 can be, for example, a public or private network such as a Local Area Network (LAN), a Wide Area Network (WAN), an intranet, and/or the Internet.

Many other embodiments of simulation system 100 are also possible. For example, multiple devices of the same type can be present. There can be multiple clients 110, multiple servers 120, and/or multiple data servers 130, some or all of which are interconnected.

Figure 2:
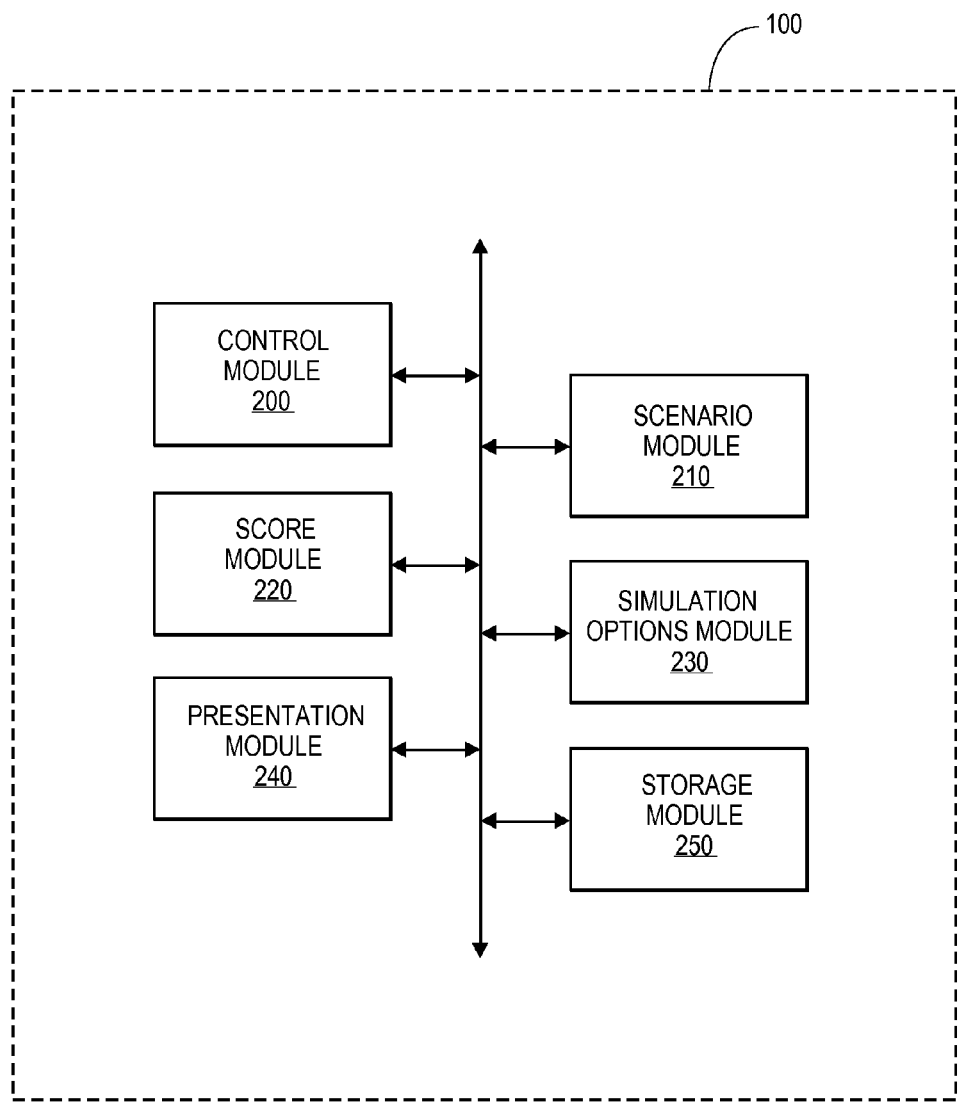
FIG. 2 is a block diagram of modules within a credit score simulation system, according to one embodiment of the invention.

FIG. 2 is a block diagram of modules within a credit score simulation system, according to one embodiment of the invention. Generally, a simulation system 100 includes a plurality of modules for determining a credit score that is based on modified credit data. In the illustrated embodiment, the simulation system 100 includes six modules that are communicatively coupled: a control module 200, a scenario module 210, a score module 220, a simulation options module 230, a presentation module 240, and storage module 250. The modules 200, 210, 220, 230, 240, 250 can be coupled using, for example, a data bus, a cable, and/or a network.

As used herein, the term "module" refers to computer program logic or instructions for providing the specified functionality. A module can be implemented in hardware, firmware, and/or software. In one embodiment, a module is a set of program instructions that is loaded into a memory and executed by a processor. The program instructions can be distributed, e.g., on a computer-readable medium or on a storage device and can be in any appropriate form, such as source code, object code, and/or scripting code.

The control module 200 controls the operation and process flow of the simulation system 100, transmitting instructions and data to as well as receiving data from the modules 210, 220, 230, 240, 250. The control module 200 causes the simulation system 100 to operate differently based on the input that has been received. The control module 200 will be further discussed below.

The scenario module 210 determines a scenario that includes one or more credit data elements and their values. A value is determined, for example, based on one or more values in the storage module 250. Exactly how the value is determined can vary based on the type of calculation that has been requested. In one embodiment, a value is set equal to a value in the storage module 250. In another embodiment, a value is calculated based on one or more values in the storage module 250. The scenario module 210 will be further discussed below.

The score module 220 determines a credit score given a scenario. In one embodiment, the simulation system 100 includes a plurality of score modules 220. Each score module can determine a credit score in a different way. This means that the same credit data can result in two different credit scores. In one embodiment, three score modules 220 are used, and their methods of determining credit scores correspond to the methods used by the Experian, Equifax, and TransUnion credit bureaus.

Figure 4:
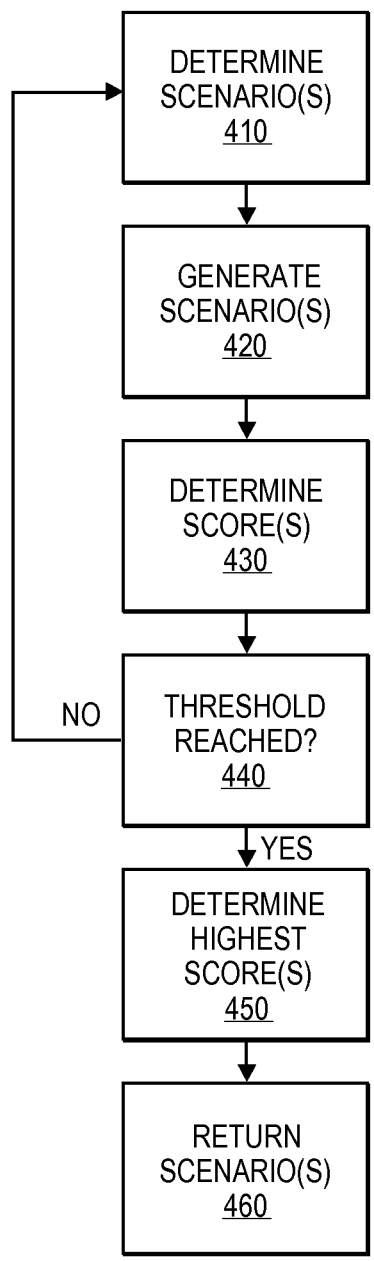
FIG. 4 is a flow chart of a method for answering a complex question, according to one embodiment of the invention.

The simulation options module 230 determines an answer to a complex question, such as how to allocate a sum of money so that the credit score is maximized. FIG. 4 is a flow chart of a method for answering a complex question, according to one embodiment of the invention. The simulation options module 230 determines 410 one or more scenarios to simulate. The sample space of possible scenarios can be defined by the question. For example, if the question is how to allocate a sum of money so that the credit score is maximized, a scenario will include allocating money (up to the amount specified). As described above, within the sample space, these scenarios can be chosen randomly or they can be chosen based on, for example, coverage of the sample space or knowledge of the underlying scoring algorithm used by the score module 220. (In subsequent passes, the scenarios can also be chosen based on the scores of other scenarios. In the first pass, however, no scores have been determined.)

The scenario module 210 generates 420 one or more scenarios, and the score module 220 determines 430 one or more credit scores (one for each scenario). The simulation options module 230 determines 440 whether the threshold value has been reached. If it has not been reached, then another iteration starts and steps 410-440 are repeated. (Since this is a subsequent pass, scenarios can now be chosen based on the scores of other scenarios.) If it has been reached, then the simulation options module 230 analyzes 450 the results and returns 460 one or more scenarios. For example, the simulation options module 230 identifies 450 the four actions (or sets of actions) that will increase the credit score the most and returns 460 the four actions (or sets of actions). The simulation options module 230 is used to support the Suggested Actions and Common Simulations features, which will be discussed below.

The presentation module 240 generates a user interface that enables a user to specify simulation options and that presents simulation results (if any). In one embodiment, the presentation module 240 generates a web page (e.g., an HTML file), and the web page is presented to the user via a web browser. In another embodiment, the presentation module 240 generates a sound clip, and the sound clip is presented to the user via a speaker.

The storage module 250 stores one or more credit data elements and zero or more values for each credit data element (e.g., an original value, a first modified value, and a second modified value). The values can be hypothetical or they can be real-life values that correspond to an actual person. The values can be entered manually (e.g., using a keyboard or pointing device) or they can be obtained from a file. The values can originate from an individual (e.g., a consumer) or they can originate from an institution (e.g., a credit bureau).

In real-life, the information about an entity that is collected by a credit bureau can differ from bureau to bureau. For example, one credit bureau may show a person as having only two credit cards, while another credit bureau may show the same person as having three credit cards. In one embodiment, the storage module 250 includes multiple sets of data, one for each credit bureau. By accessing this data, the scenario module 210 can generate a scenario that represents data collected by a particular credit bureau. For example, the scenario module 210 can generate a scenario that represents data collected by Experian. Since information can differ among credit bureaus, an Experian scenario might differ from an Equifax or TransUnion scenario. This means that the scenarios might yield different credit scores when input into the score module 220.

Those of skill in the art will understand that other embodiments of the simulation system 100 can have different and/or other modules than the ones described herein. For example, a non-interactive simulation system 100 might not have a presentation module 240. Rather than using the presentation module 240 to present the results to the user, the system 100 could store its results in a file. In addition, the functionalities can be distributed among the modules in a manner different than described herein.

User Scenarios

Figure 3:
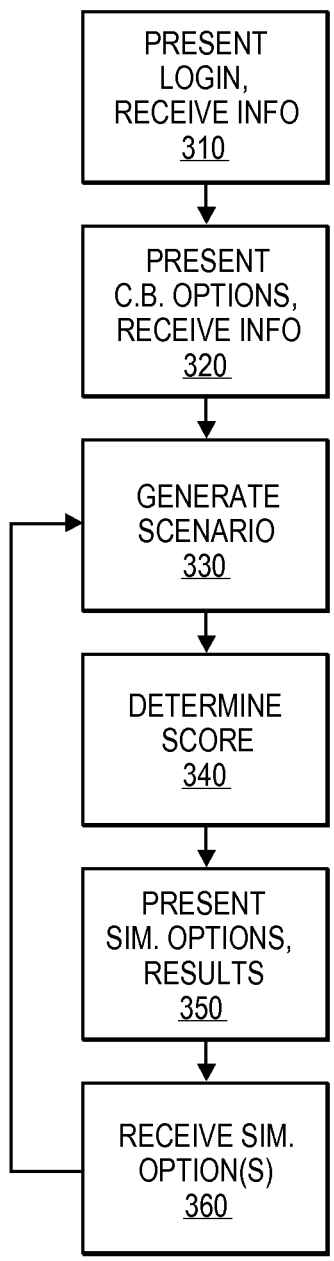
FIG. 3 is a flow chart of a method of operation for a credit score simulation system, according to one embodiment of the invention.
Figure 5:
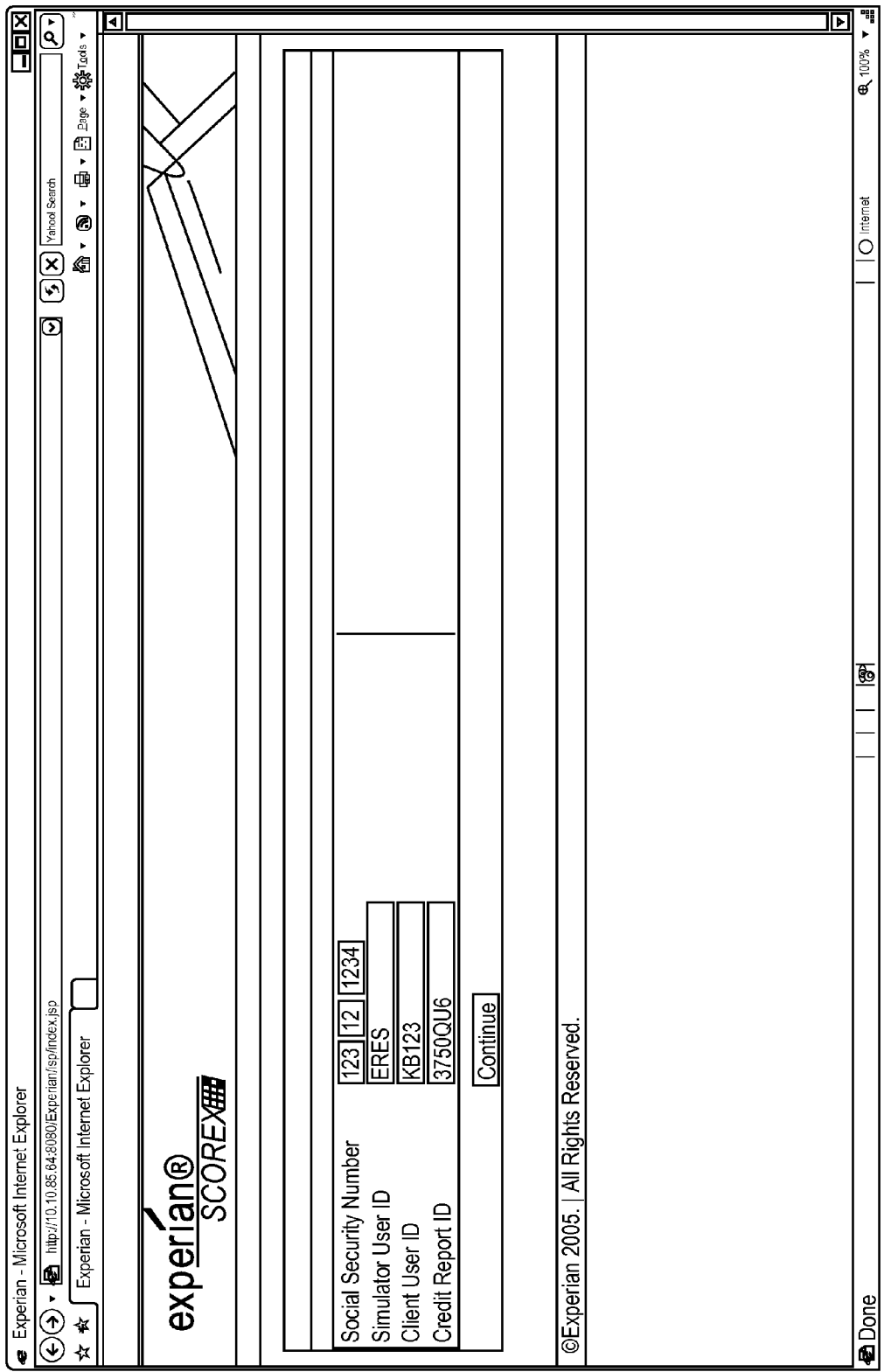
FIG. 5 is a user interface that shows login details, according to one embodiment of the invention.

FIG. 3 is a flow chart of a method of operation for a credit score simulation system, according to one embodiment of the invention. The control module 200 causes the simulation system 100 to perform the method 300. A login is presented 310 to a user. FIG. 5 is a user interface that shows login details, according to one embodiment of the invention. In the illustrated embodiment, the user is using a web browser software application, and the login comprises a web page that is displayed by the web browser. The user identifies herself by, for example, entering a user ID and password into various fields of the web page. This information is received 310, and the password is checked against a password file.

In FIG. 5, the user enters a Simulator User ID, a Client User ID, and a Credit Report ID. The user also enters a Social Security Number, which belongs to the person whose credit score will be simulated. Note that this person may not be the same person as the user. For example, the user might be a mortgage lender, while the Social Security Number might belong to the applicant (i.e., the person who is applying for the mortgage).

Figure 6:
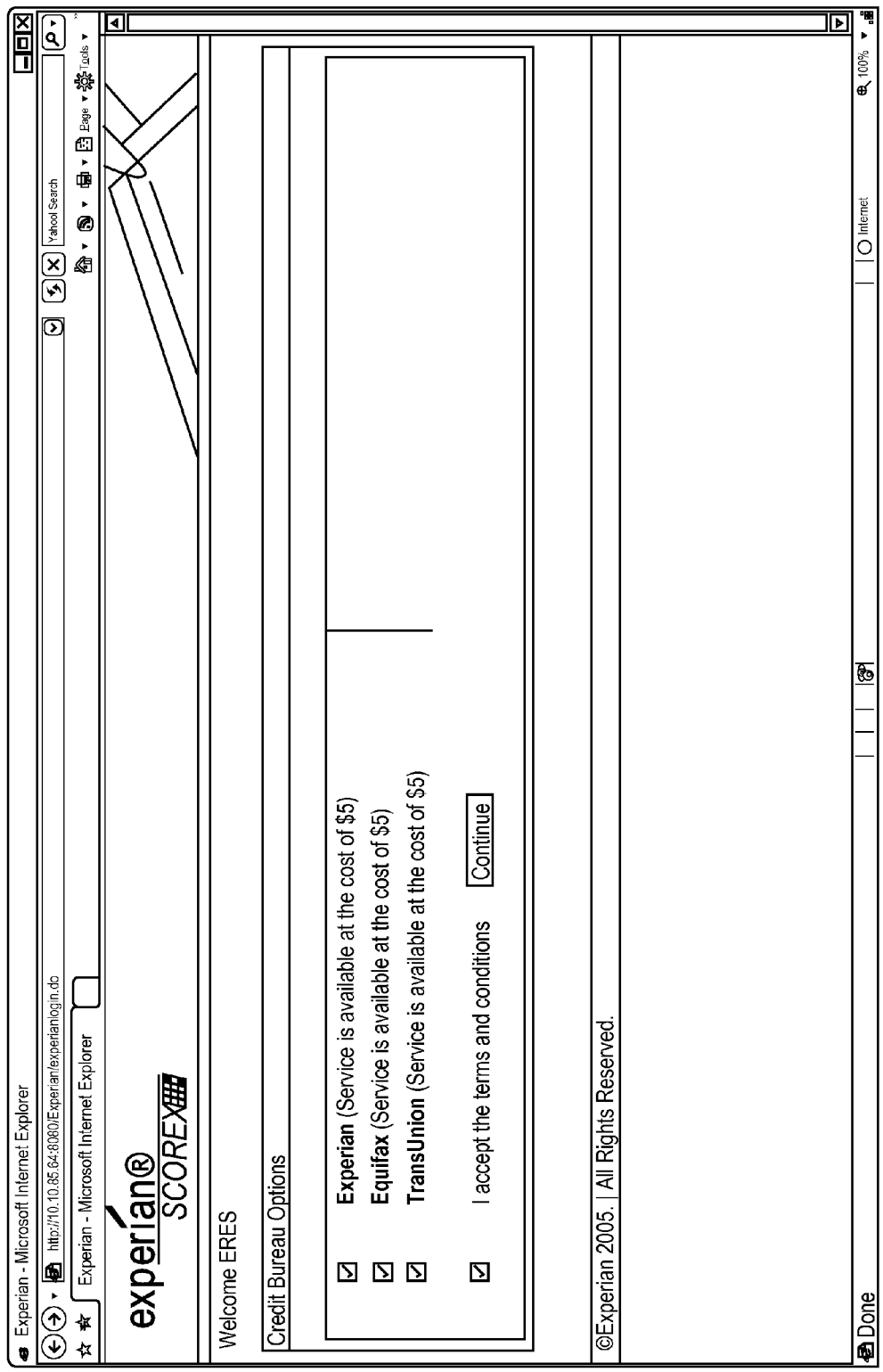
FIG. 6 is a user interface that shows credit bureau options, according to one embodiment of the invention.

In FIG. 3, if the password is correct, credit bureau options are presented 320 to the user. In one embodiment, the storage module 250 includes multiple sets of data, one for each credit bureau, as discussed above. FIG. 6 is a user interface that shows credit bureau options, according to one embodiment of the invention. In FIG. 6, the user can select Experian, Equifax, and/or TransUnion. In the illustrated embodiment, the user has selected all three. Thus, the user will be able to determine credit scores based on three possible sets of data: data collected by Experian, data collected by Equifax, and data collected by TransUnion. The credit bureau information is received 320.

In one embodiment, the simulation system 100 includes one score module 220. This score module 200 can determine a credit score based on any scenario, whether the scenario represents Experian data, Equifax data, or TransUnion data. In another embodiment, the system 100 includes multiple score modules 220, where each score module 220 determines a credit score using a different scoring algorithm. In one embodiment, there are three score modules 220: one that applies the Experian algorithm, one that applies the Equifax algorithm, and one that applies the TransUnion algorithm.

The scenario module 210 generates 330 one or more scenarios, depending on the credit bureau options that were received in step 320. For example, if three credit bureaus were selected, then the scenario module 210 would generate 330 three scenarios, one representing Experian data, one representing Equifax data, and one representing TransUnion data. In the first pass through step 330, the credit data elements in the scenario(s) (and their values) correspond to the credit bureau data for the person represented by the Social Security Number that was received in step 310. In subsequent passes, the credit data elements in the scenario(s) can differ based on simulation options, as described below.

The score module 220 determines 340 one or more credit scores based on the one or more scenarios. For example, if the scenario module 210 generated 330 three scenarios, then the score module 220 would determine 340 three credit scores.

Figure 7:
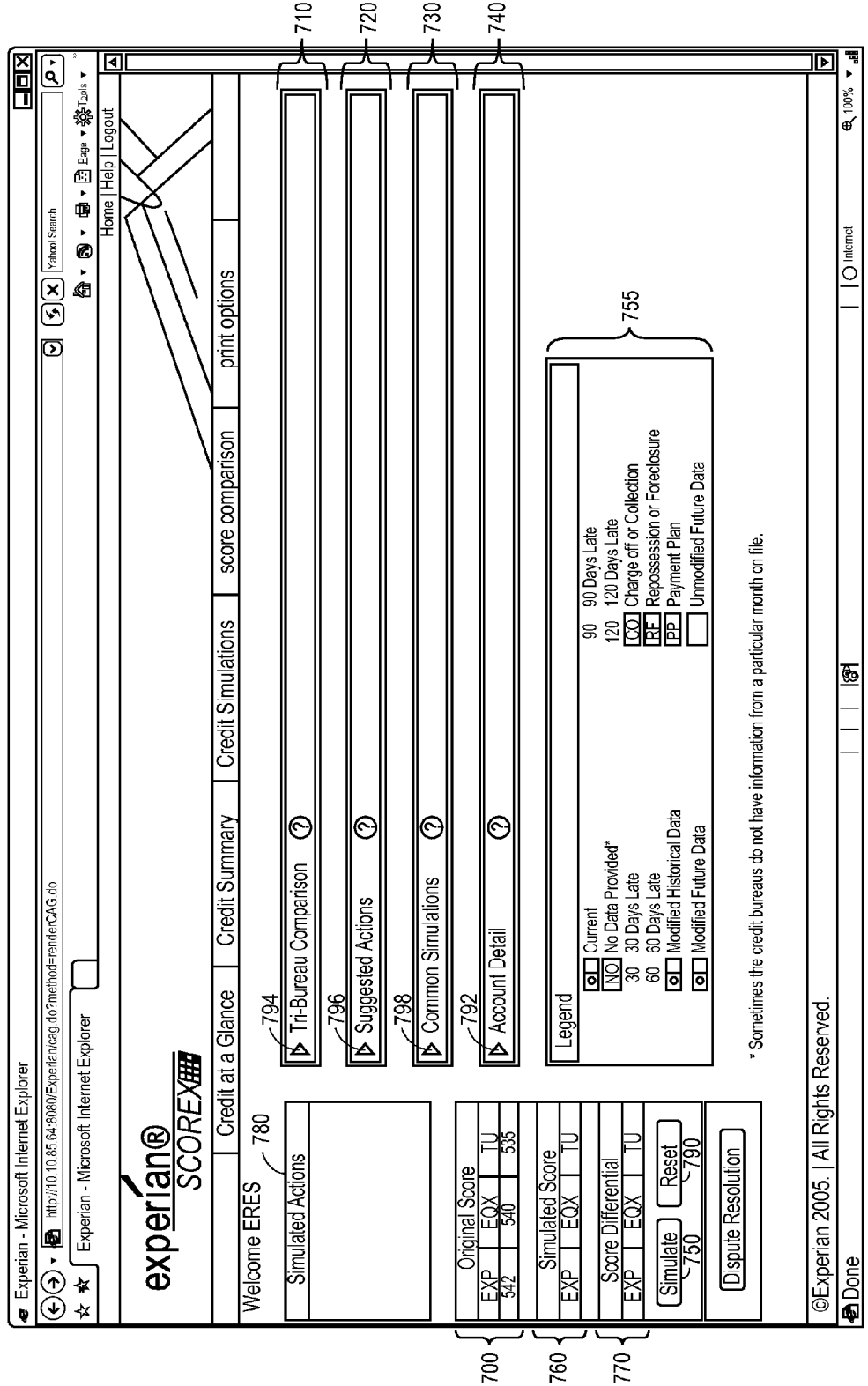
FIG. 7 is a user interface that shows simulation options, according to one embodiment of the invention.

The presentation module 240 formats the one or more credit scores to generate a user interface, and they are presented 350 to the user, along with one or more simulation options. (In subsequent passes, simulation results will also be presented 350. In the first pass, however, no simulation has been performed.) In one embodiment, the simulation options are set using various user interface elements. FIG. 7 is a user interface that shows simulation options, according to one embodiment of the invention. The illustrated embodiment includes an Original Score area 700. The Original Score area 700 includes a table with three columns: one for Experian, one for Equifax, and one for TransUnion. The information in the table represents the credit score that was determined in the first pass of step 340. Since the illustrated embodiment uses sets of data from three credit bureaus, three credit scores are shown: 542, 540, and 535. These scores are based on the scenarios that were generated in the first pass of step 330.

In the illustrated embodiment, the simulation options are grouped into four areas: Tri-Bureau Comparison 710, Suggested Actions 720, Common Simulations 730, and Account Detail 740. Each of these areas will be discussed below. The user defines a scenario using one or more simulation options in one or more of these areas. The user then selects the Simulate 750 button in order to simulate the scenario. FIG. 7 also includes a Legend area 755, which will be discussed below.

The results of the simulation would be shown in the Simulated Score area 760 and the Score Differential area 770. (In FIG. 7, the Simulate button 750 has not been selected, so no simulation results are shown.) The Simulated Score area 760 would show the three simulated credit scores, while the Score Differential area 770 would show the differences between the simulated scores and the original scores. Also, the Simulated Actions area 780 would include text that described which actions had been simulated. In one embodiment, if no actions have been simulated, then no text appears in the Simulated Actions area 780.

In one embodiment, simulation options set by a user remain even after they have been simulated. In this way, the user can build upon previous simulations without having to re-enter all of the options each time. In one embodiment, the options can be stored between sessions so that they can be reloaded in the future. If a user wants to return to the first (original) scenario, she selects the Reset button 790.

The Account Detail area 740 shows information corresponding to particular tradelines. In one embodiment, the account detail area 740 can appear collapsed, partially expanded, or fully expanded. In FIG. 7, the Account Detail area 740 is collapsed so that it includes only the title bar. By selecting the arrow 792 to the left of the words "Account Detail," the Account Detail area 740 can toggle between collapsed and partially expanded.

Figure 8:
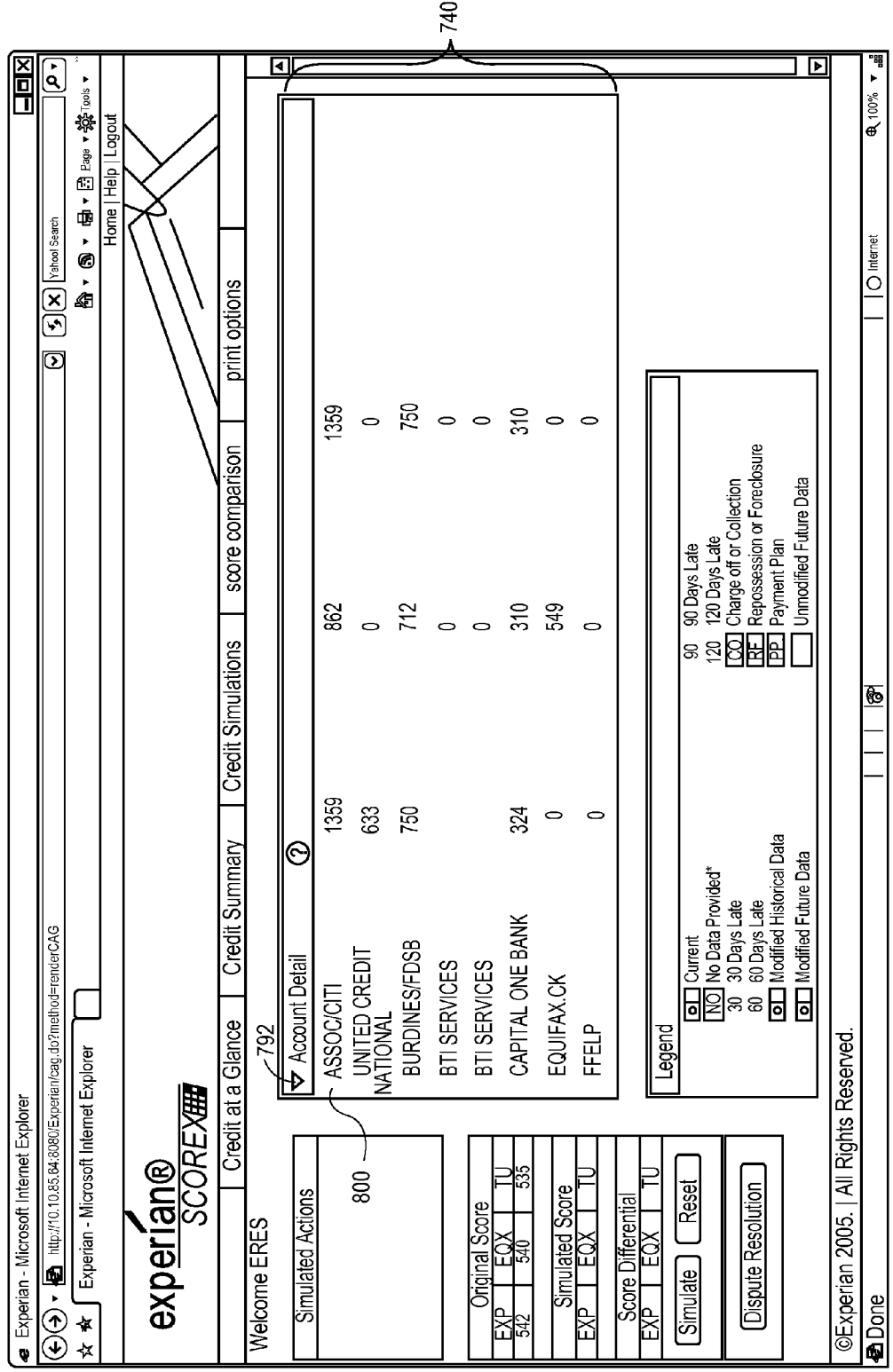
FIG. 8 is a user interface that shows simulation options and a partially expanded Account Detail area, according to one embodiment of the invention.

FIG. 8 is a user interface that shows simulation options and a partially expanded Account Detail area, according to one embodiment of the invention. In the illustrated embodiment, the Account Detail area 740 now includes the title bar and a table with eight rows, each representing one tradeline. The columns of the table represent the three credit bureaus, and the values in the table represent the balance of each tradeline according to each credit bureau. Thus, in the illustrated embodiment, ASSOC/CITI's balance is $1359 according to Experian, $862 according to Equifax, and $1359 according to TransUnion. By selecting the arrow 800 to the left of a tradeline name (here, "ASSOC/CITI", "UNITED CREDIT NATIONAL", "BURDINES/FDSB", etc.), the Account Detail area 740 can toggle between partially expanded and fully expanded.

Figure 9:
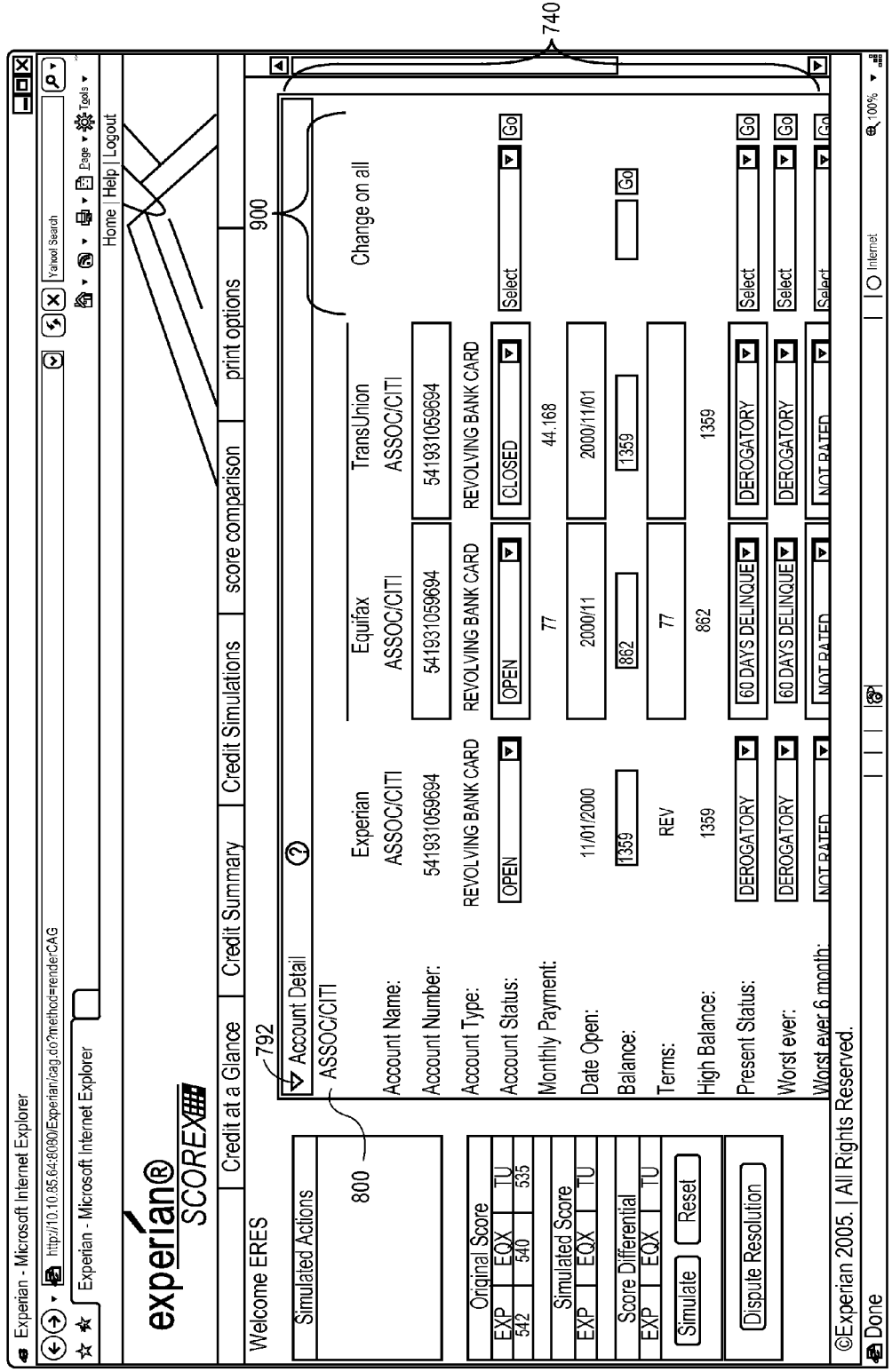
FIG. 9 is a user interface that shows simulation options and a first fully expanded Account Detail area, according to one embodiment of the invention.
Figure 10:
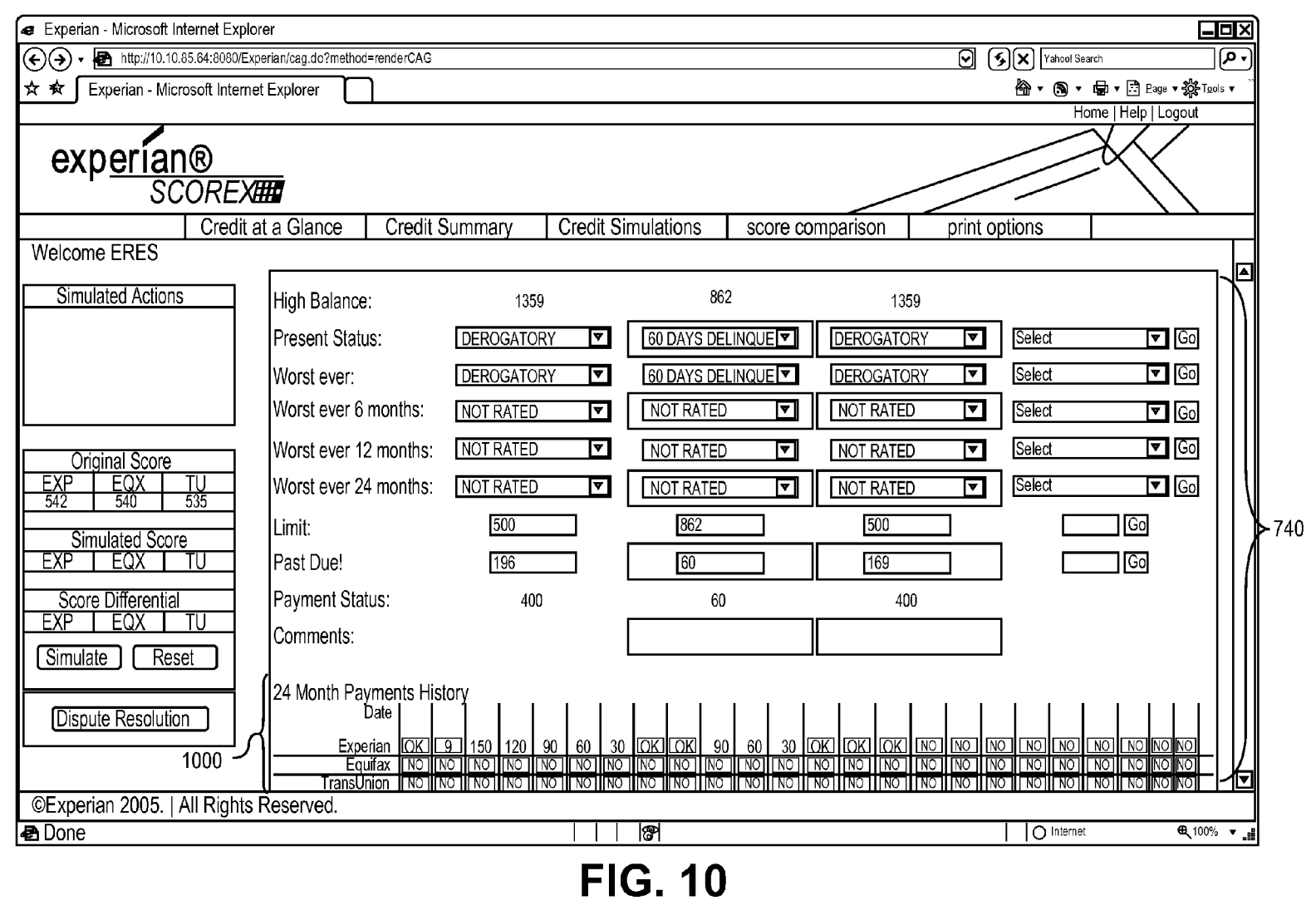

FIG. 9 is a user interface that shows simulation options and a first fully expanded Account Detail area, according to one embodiment of the invention. In the illustrated embodiment, the Account Detail area 740 now includes the following information for the ASSOC/CITI tradeline: account name, account number, account type, account status, monthly payment, date open, balance, terms, high balance, present status, worst ever, and worst ever 6 months. FIG. 10 is the user interface of FIG. 9, except that the window has been scrolled down to expose a different area. The newly-exposed area shows the following tradeline information: worst ever 12 months, worst ever 24 months, limit, past due, payment status, and comments.

In one embodiment, the Account Detail area 740 enables a user to change any of this information and then run a simulation. In the illustrated embodiment, some of the information cannot be changed. This is because, for example, the information does not necessarily affect the credit score (e.g., account number) or the information affects the credit score but cannot be changed in real-life (e.g., date open). In one embodiment, the possible values for each field are as follows: account status ("open" or "closed"), balance (any number; represents current balance), high balance (any number; represents highest balance ever), present status (current, delinquent, time delinquent, amount delinquent), worst ever (cumulative delinquent status for all time), worst ever 6 months (cumulative delinquent status for past 6 months), worst ever 12 months (cumulative delinquent status for past 12 months), and worst ever 24 months (cumulative delinquent status for past 24 months).

In one embodiment, the Account Detail area 740 enables a user to change a piece of information for each credit bureau independently. In another embodiment, rather than change the same piece of information for all three credit bureaus, the user can indicate that one piece of information should be used for all bureaus. In the illustrated embodiment, this is achieved by entering the information in the "Change on all" column 900.

In one embodiment, the Account Detail area 740 also includes a 24 Month Payment History area 1000. The 24 Month Payment History area 1000 shows, on a per-month basis, whether the past 24 months of payments were received on time and, if they were not, what eventually happened regarding the balance. In the illustrated embodiment, the 24 Month Payment History area 1000 includes three rows: one based on Experian data, one based on Equifax data, and one based on TransUnion data.

In one embodiment, the 24 Month Payment History area 1000 enables a user to change any of the payment history information and then run a simulation. Of course, this is just for informational purposes, since the payment history is fixed and cannot be changed in real-life (unless, of course, the information does not reflect what actually happened and is therefore incorrect). In the illustrated embodiment, the payment history information for a particular month can be changed by selecting the portion of the 24 Month Payment History area 1000 that represents that month (not shown).

The 24 Month Payment History area 1000 is further explained by a Legend area 755, as shown in FIG. 7. In the illustrated embodiment, the Legend Area 755 includes symbols that represent the following payment information: current, 30 days late, 60 days late, 90 days late, 120 days late, modified historical data, modified future data, unmodified future data, chargeoff or collection, repossession or foreclosure, payment plan, and no data provided.

Figure 11:
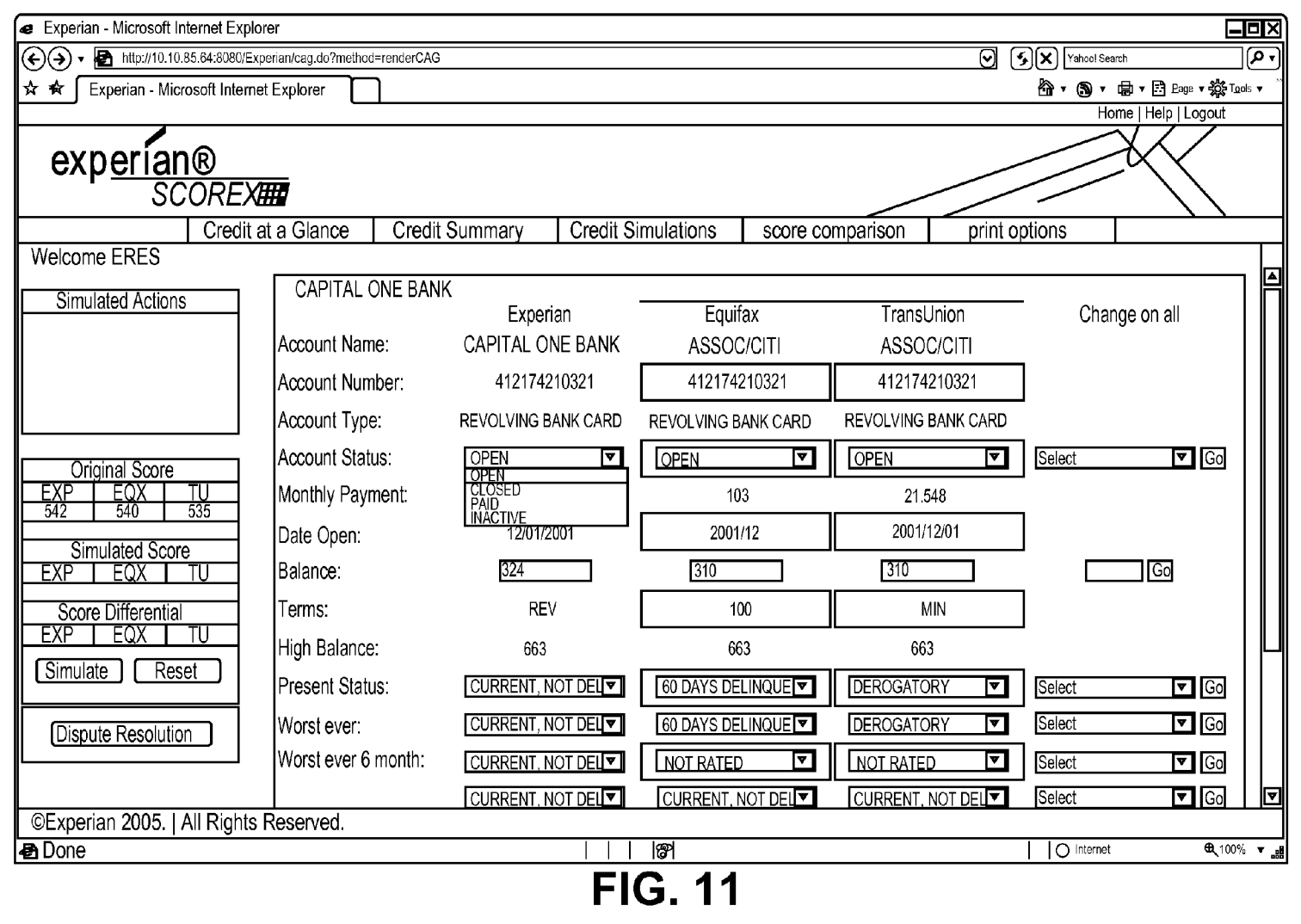
Figure 12:
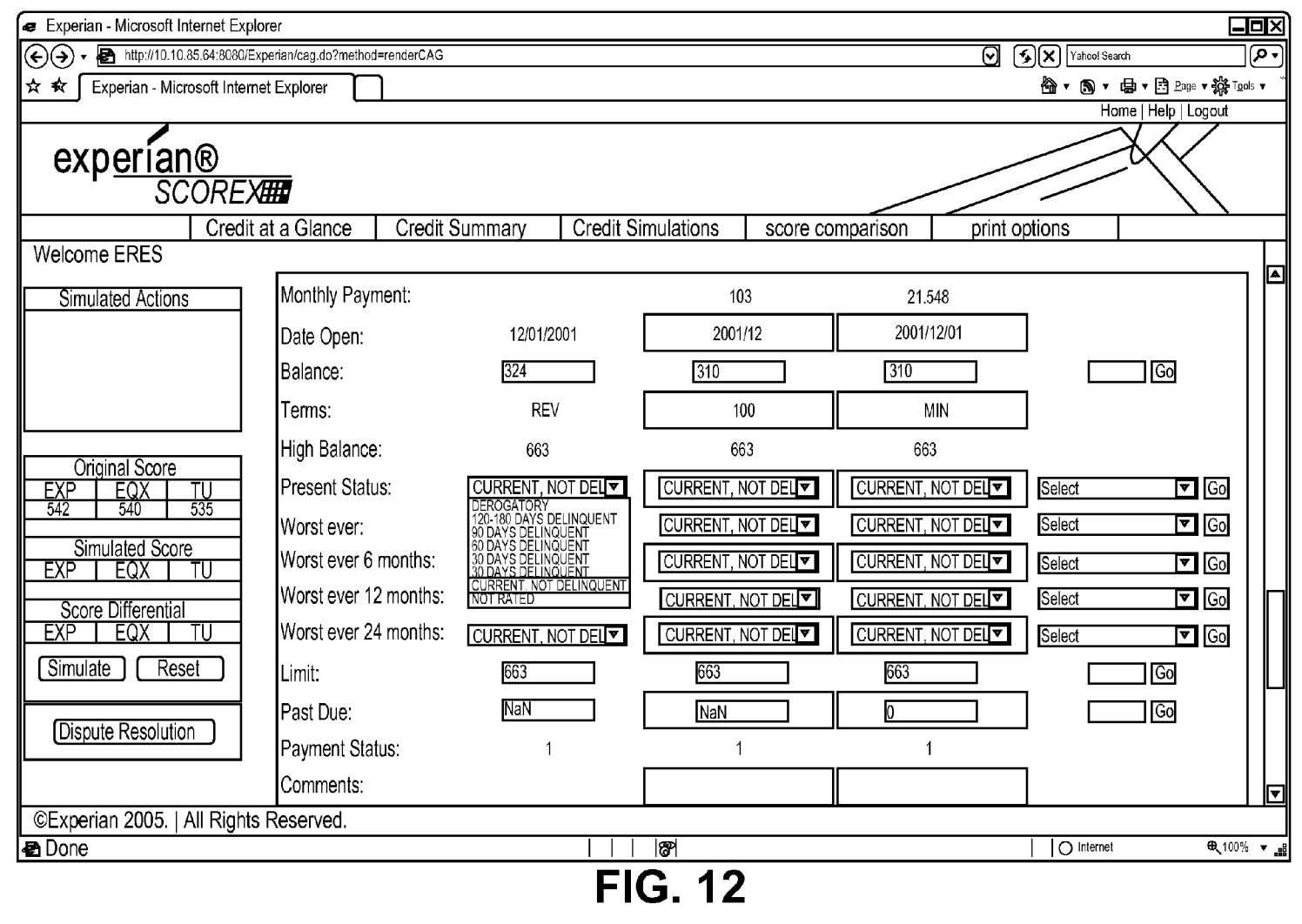
Figure 13:
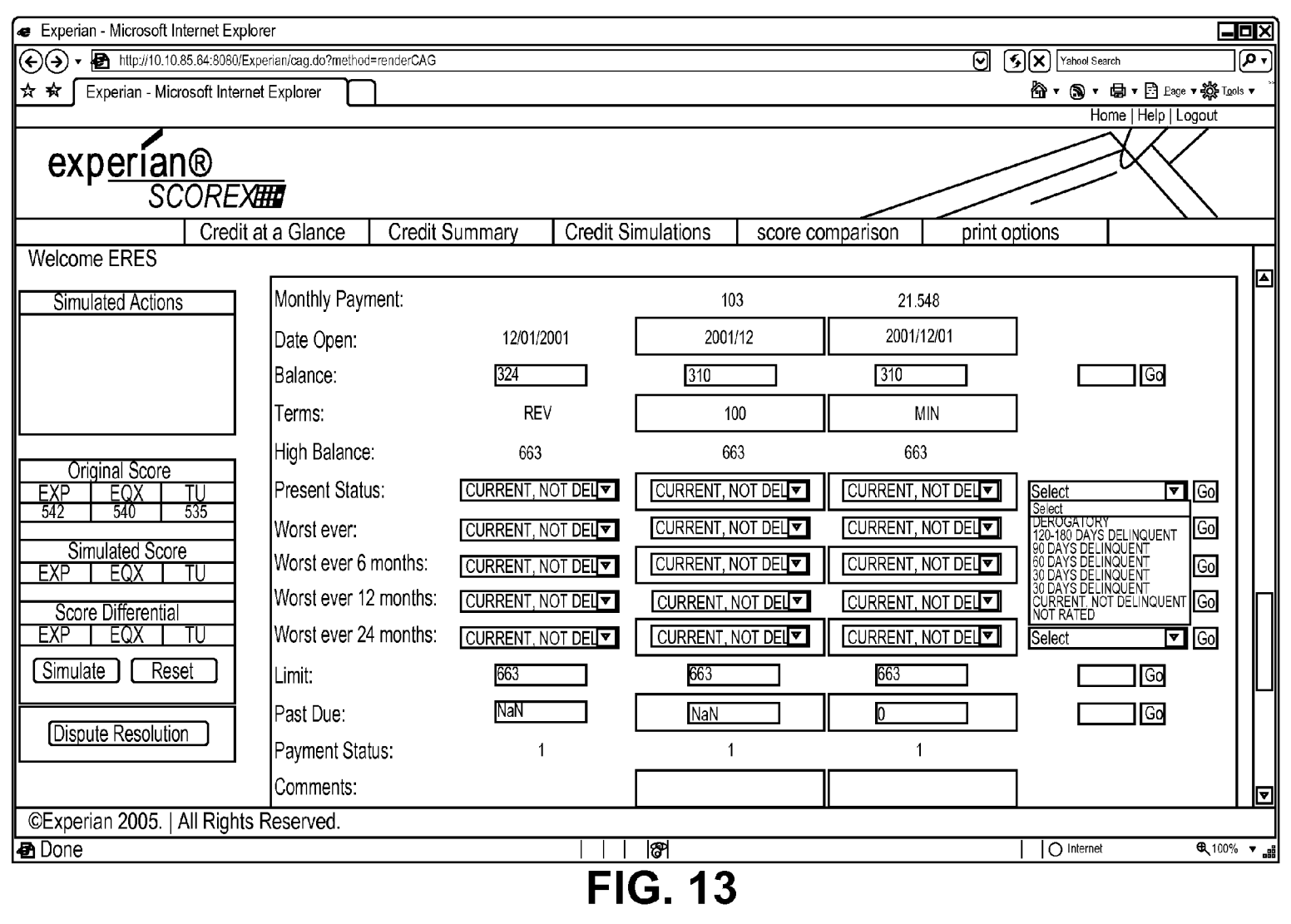

FIG. 11 is a user interface that shows simulation options, a second fully expanded Account Detail area, and an expanded Experian account status pull-down menu, according to one embodiment of the invention. FIG. 12 is a user interface that shows simulation options, a second fully expanded Account Detail area, and an expanded Experian present status pull-down menu, according to one embodiment of the invention. FIG. 13 is a user interface that shows simulation options, a second fully expanded Account Detail area, and an expanded "Change on all" present status pull-down menu, according to one embodiment of the invention.

As mentioned above, the information about an entity that is collected by a credit bureau can differ from bureau to bureau. In the illustrated embodiment, the Account Detail area 740 lists tradeline information for multiple credit bureaus. Thus, if there is a discrepancy in this information, it will be reflected in the Account Detail area 740. Specifically, one row of the Account Detail area 740 will contain unequal values.

The Tri-Bureau Comparison area 710 enables a user to identify discrepancies more easily. In FIG. 7, the Tri-Bureau Comparison area 710 is collapsed so that it includes only the title bar. By selecting the arrow 794 to the left of the words "Tri-Bureau Comparison," the Tri-Bureau Comparison area 710 can toggle between collapsed and expanded.

Figure 14:
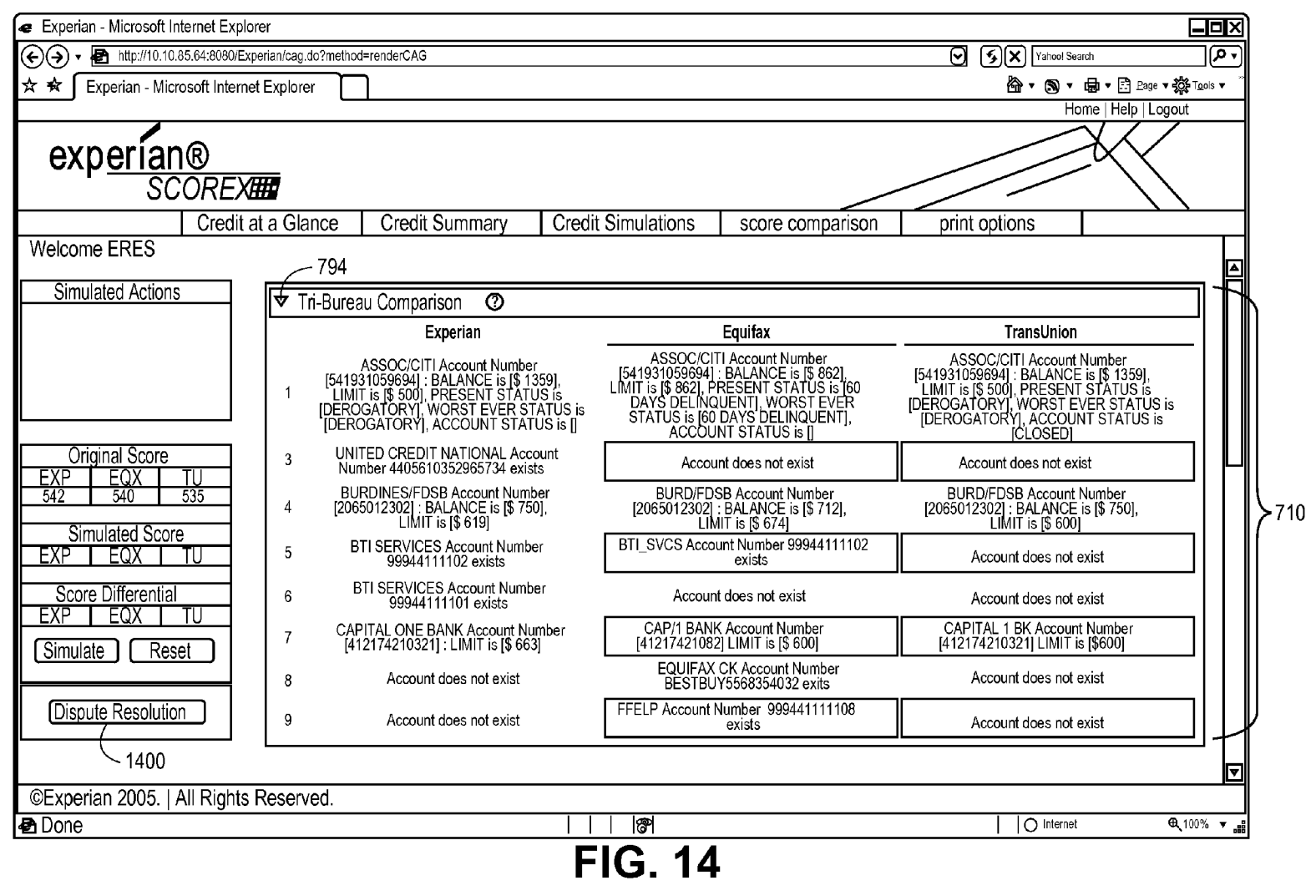

FIG. 14 is a user interface that shows simulation options and an expanded Tri-Bureau Comparison area, according to one embodiment of the invention. In the illustrated embodiment, the Tri-Bureau Comparison area 710 now includes the title bar and a table with eight rows, each representing one tradeline. The columns of the table represent the three credit bureaus, and the values in the table represent information about each tradeline according to each credit bureau. In the illustrated embodiment, Experian data shows that a tradeline exists with a name of ASSOC/CITI, an account number of 541931059694, and a balance of $1359, while Equifax data shows that the same tradeline (same name and number) has a balance of $862, and TransUnion data shows that the same tradeline has a balance of $1359.

In one embodiment, the Tri-Bureau Comparison area 710 shows only information where there is a discrepancy. In another embodiment, the Tri-Bureau Comparison area 710 shows all information (whether or not there is a discrepancy), but indicates where discrepancies exist. For example, information where there is a discrepancy is shown first, and information where there is not a discrepancy is shown second (e.g., farther below). As another example, information where there is a discrepancy is shown in a different way (e.g., in a different color, highlighted, or marked by a symbol) than information where there is not a discrepancy. In one embodiment, the Change on all column 900 in the Account Detail area 740 can be used to simulate correct information when a discrepancy exists.

In the illustrated embodiment, the Dispute Resolution button 1400 can help the user correct discrepancies. For example, it can direct the user to a credit bureau's dispute resolution department or help the user compose a letter notifying the credit bureau that a discrepancy exists. In another embodiment (not shown), a user interface element helps the user perform an action that has been simulated. This can include, for example, applying for new credit, consolidating loans, and refinancing a mortgage. In another embodiment (also not shown), a user interface element helps the user research and/or obtain related products and/or services, such as credit reports and credit monitoring.

The Suggested Actions area 720 includes one or more actions (or one or more sets of actions) that can be simulated. In FIG. 7, the Suggested Actions area 720 is collapsed so that it includes only the title bar. By selecting the arrow 796 to the left of the words "Suggested Actions," the Suggested Actions area 720 can toggle between collapsed and expanded.

Figure 15:
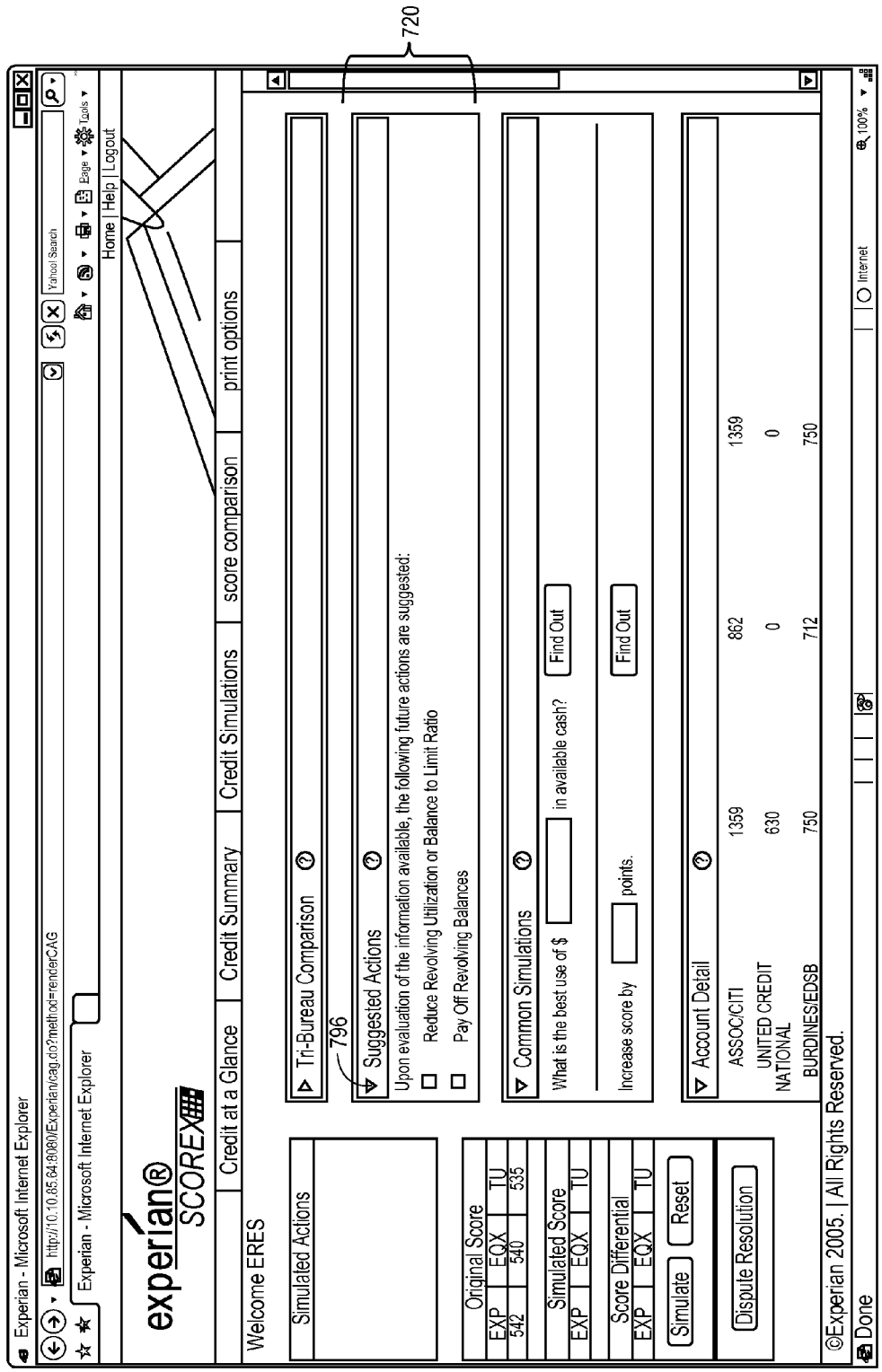
FIG. 15 is a user interface that shows simulation options and an expanded Suggested Actions area, according to one embodiment of the invention.

FIG. 15 is a user interface that shows simulation options and an expanded Suggested Actions area, according to one embodiment of the invention. In one embodiment, if a set of actions is shown, the user can select all of the actions for simulation or select only a subset. If selected, an action will be taken into account when the Simulate button 750 is selected and a scenario is generated. For example, if the action "pay off all credit cards" was selected then the credit data elements that represented the credit card balances would be set to zero in the scenario.

In the illustrated embodiment, two actions are shown: "Reduce Revolving Utilization or Balance to Limit Ratio" and "Pay Off Revolving Balances." A user can select an action (e.g., by selecting a checkbox) and then select the Simulate button 750 to simulate the effect that this action would have. In one embodiment (not shown), the Suggested Actions area 720 also includes explanatory text. This text can indicate, for example, the effects caused by performing the actions and the prerequisites for performing the actions (e.g., available funds).

Figure 16:
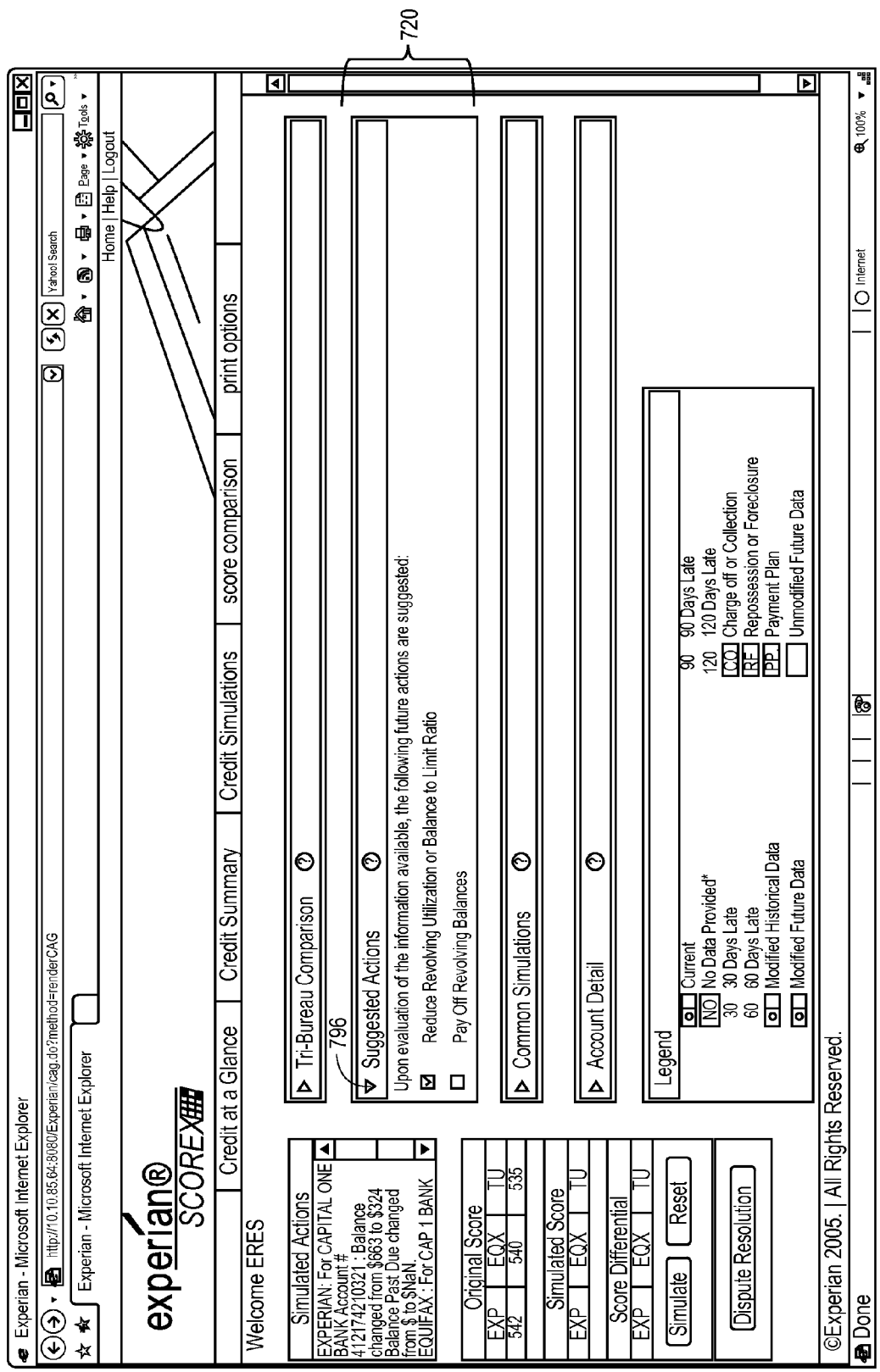
FIG. 16 is a user interface that shows simulation options and an expanded Suggested Actions area where a selection has been made and a simulation has been run, according to one embodiment of the invention.

FIG. 16 is a user interface that shows simulation options and an expanded Suggested Actions area where a selection has been made and a simulation has been run, according to one embodiment of the invention.

In one embodiment, the particular actions (or sets of actions) listed in the Suggested Actions area 720 will increase the credit score. These actions (or sets of actions) can be determined by using the simulation options module 230, as described above. The simulation options module 230 determines an answer to a complex question. Here, the question is "What actions (or sets of actions), once performed, will increase the credit score?" In one embodiment, the Suggested Actions area 720 lists the one action (or set of actions) that will increase the score the most. In another embodiment, the Suggested Actions area 720 lists the top x actions (or sets of actions) (i.e., the x actions, or sets of actions, that will increase the score the most). In yet another embodiment, the Suggested Actions area 720 lists all actions (or sets of actions) that will increase the score. Other embodiments can show different numbers or types of actions. In addition, other embodiments can enable the user to specify characteristics of the actions, such as an amount of money to be allocated and/or when the allocation should be made.

The Common Simulations area 730 includes two questions that can be answered by the simulation system 100: "What is the best use of $x in available cash?" and "How can the credit score be increased by x points?" (which is represented by the statement "Increase score by x points"). In FIG. 7, the Common Simulations area 730 is collapsed so that it includes only the title bar. By selecting the arrow 798 to the left of the words "Common Simulations," the Common Simulations area 730 can toggle between collapsed and expanded.

Figure 17:
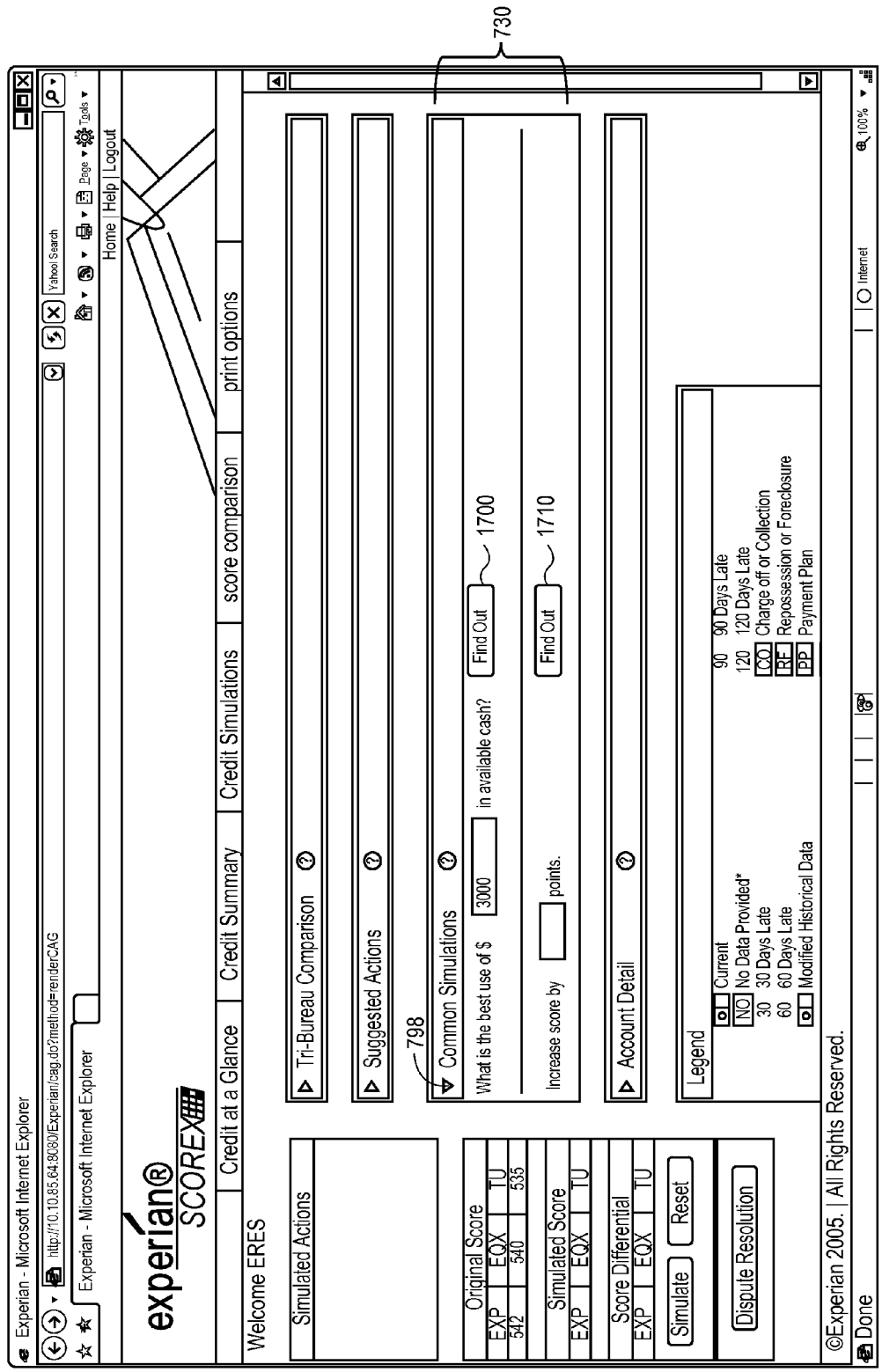
FIG. 17 is a user interface that shows simulation options and a Common Simulations area with a specified dollar value, according to one embodiment of the invention.

FIG. 17 is a user interface that shows simulation options and a Common Simulations area with a specified dollar value, according to one embodiment of the invention. The user inputs a value for one of the questions and selects the associated Find Out button 1700, 1710. As a result, one or more actions (or sets of actions) are shown and can be simulated. In other words, the actions (or sets of actions) that are shown are simulation options. These simulation options (i.e., actions or sets of actions) can be determined by using the simulation options module 230, as described above. The simulation options module 230 determines an answer to a complex question. Here, the question is either "What is the best use of $x in available cash?" or "How can the credit score be increased by x points?" (depending on which Find Out button 1700, 1710 was selected).

In one embodiment, if a set of actions is shown, the user can select all of the actions for simulation or select only a subset. If selected, an action will be taken into account when the Simulate button 750 is selected and a scenario is generated. For example, if the action "Pay $500 to CSUSA Account" is selected, then the credit data element that represents this balance will be decreased by $500 in the scenario.

Figure 18:
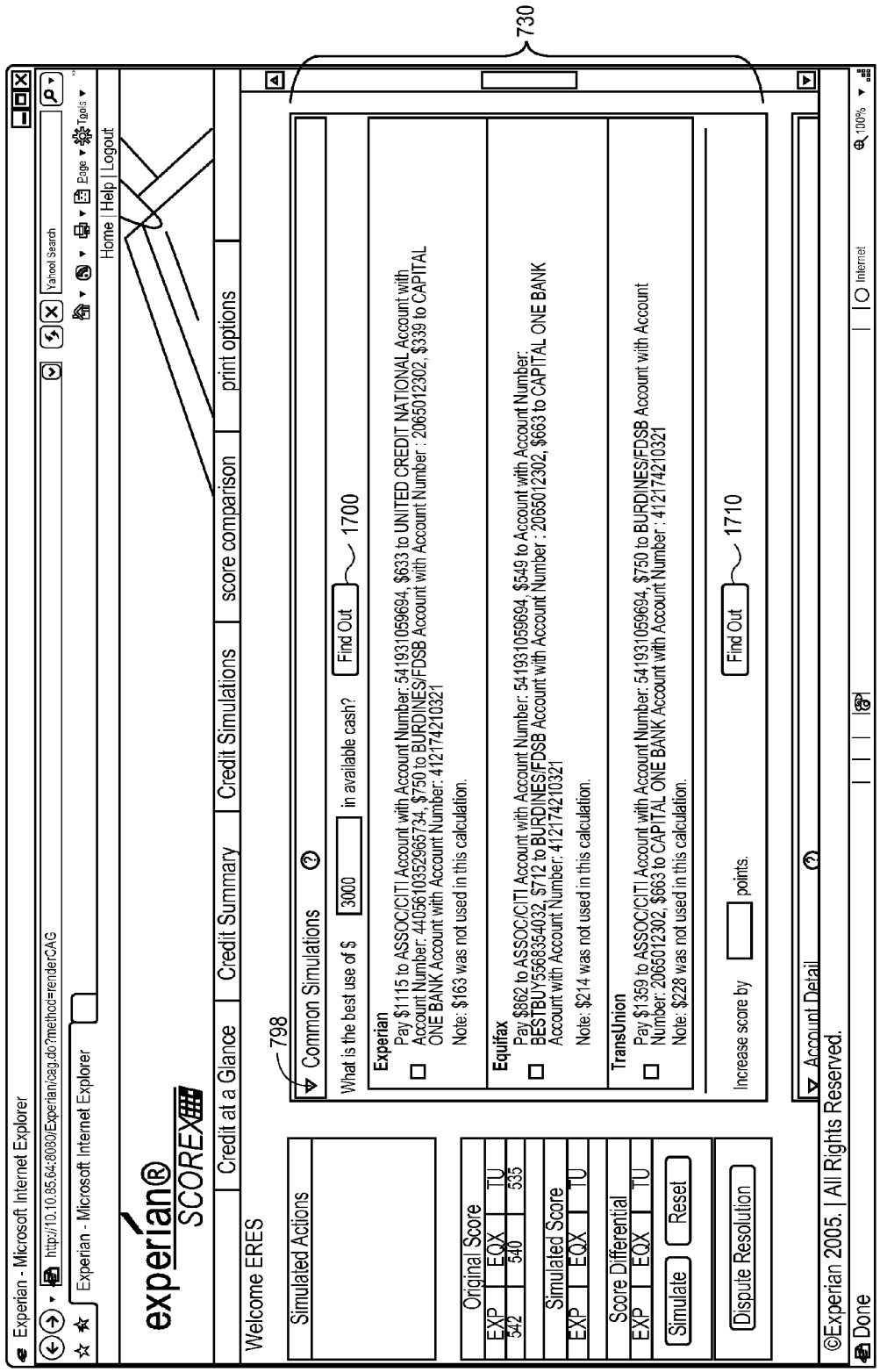
FIG. 18 is a user interface that shows simulation options and a Common Simulations area with simulation options based on a specified dollar value, according to one embodiment of the invention.
Figure 22C:
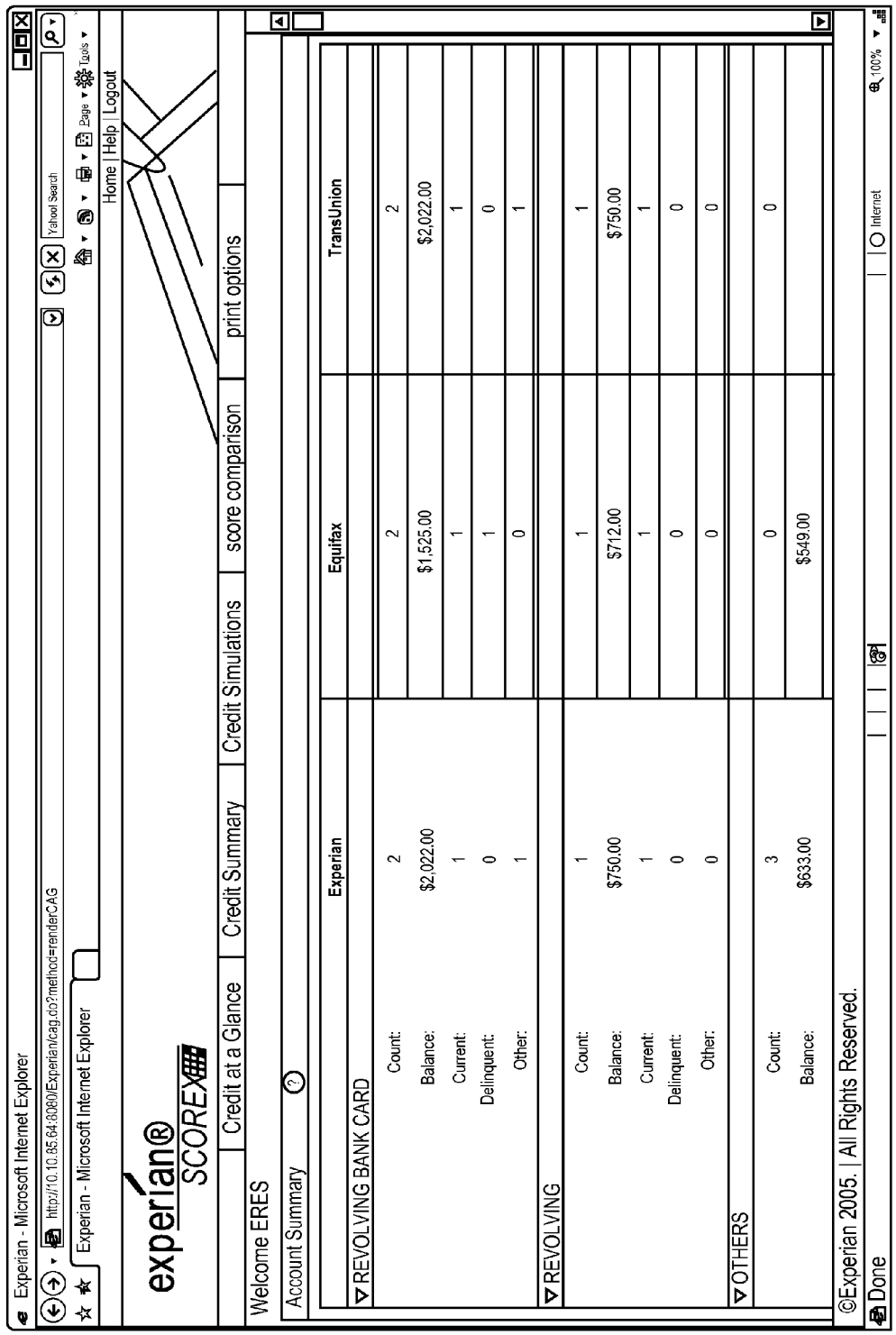
Figure 22D:
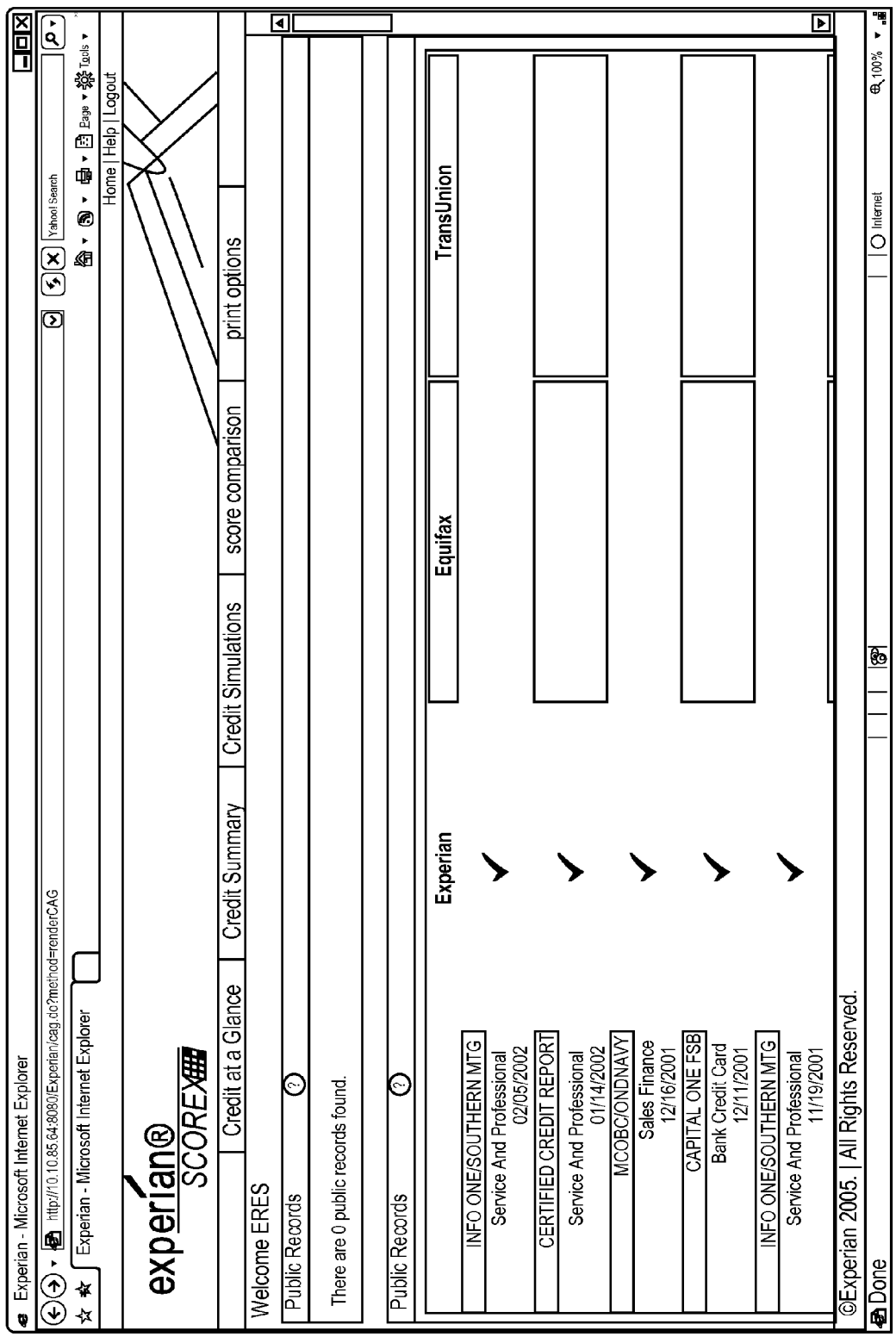
Figure 23B:
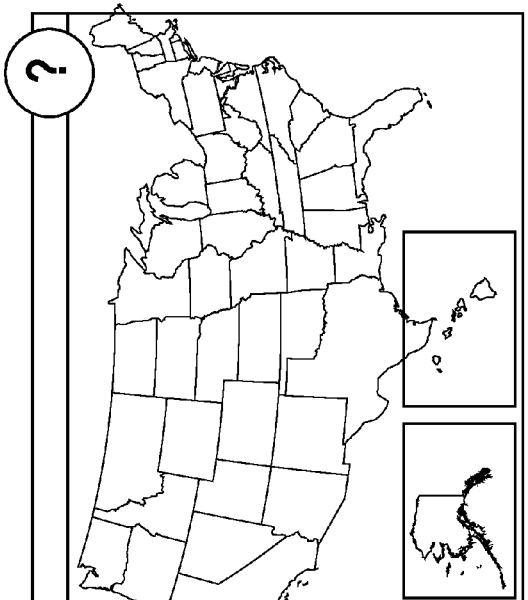
Figure 23C:
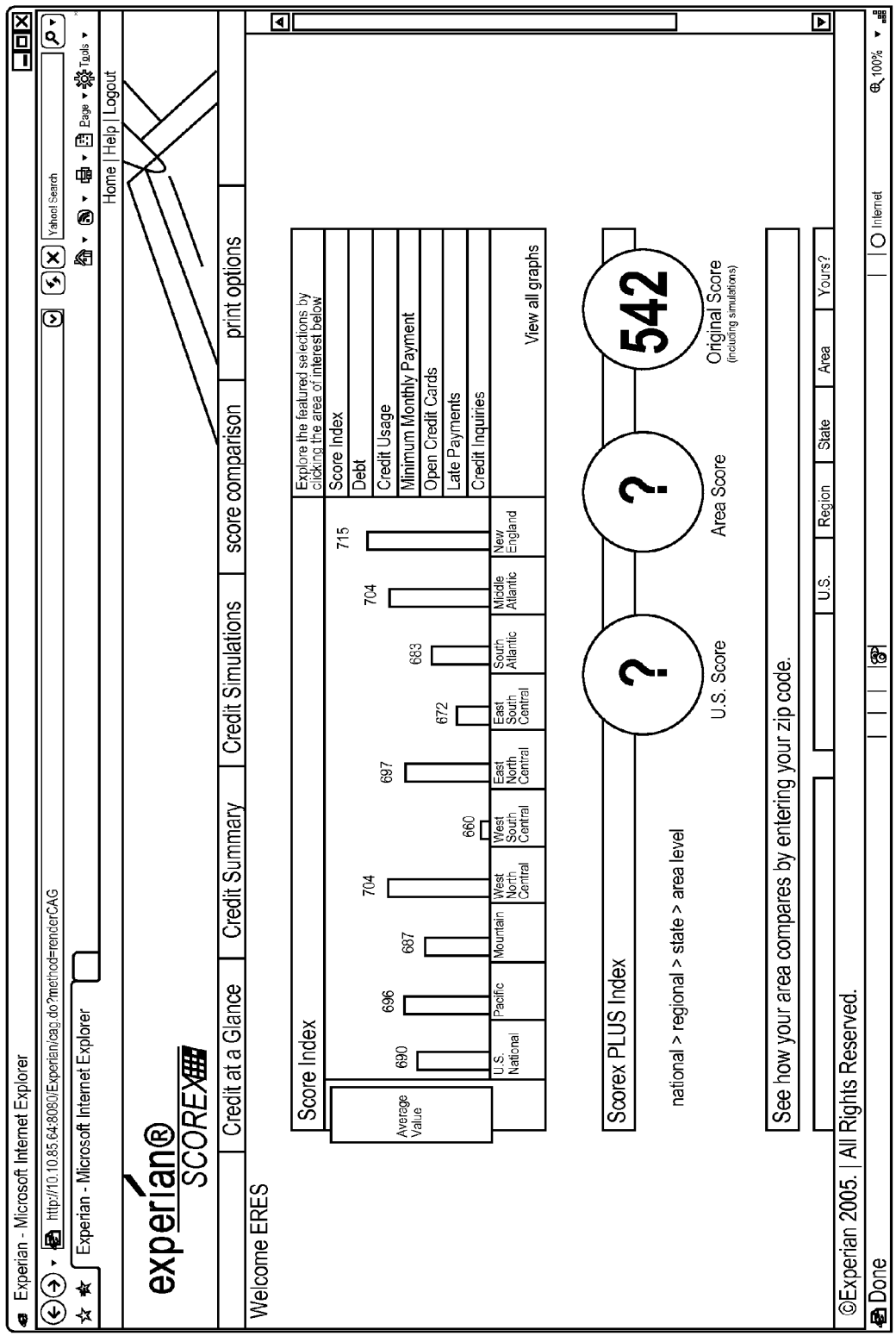
Figure 23D:
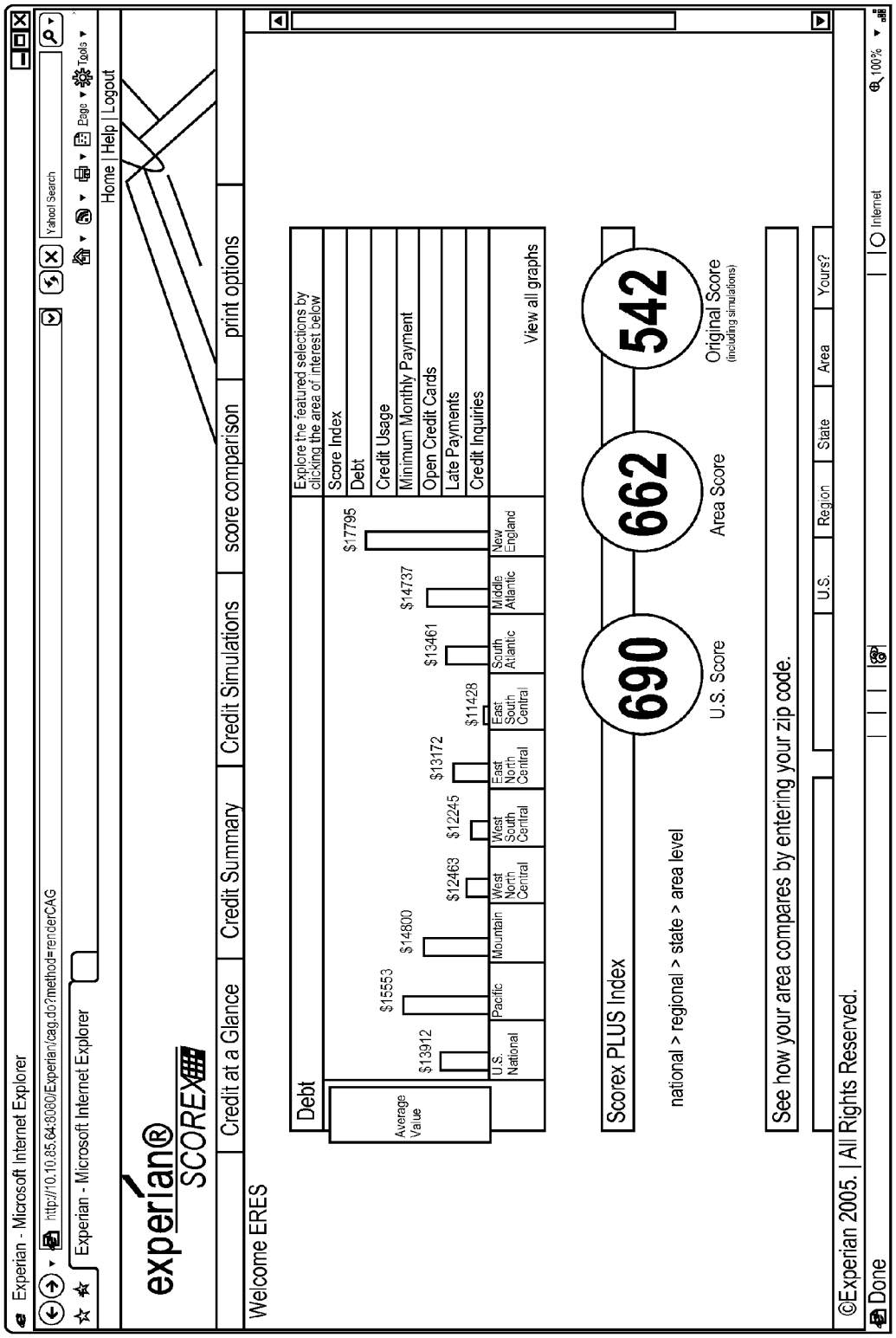
Figure 23E:
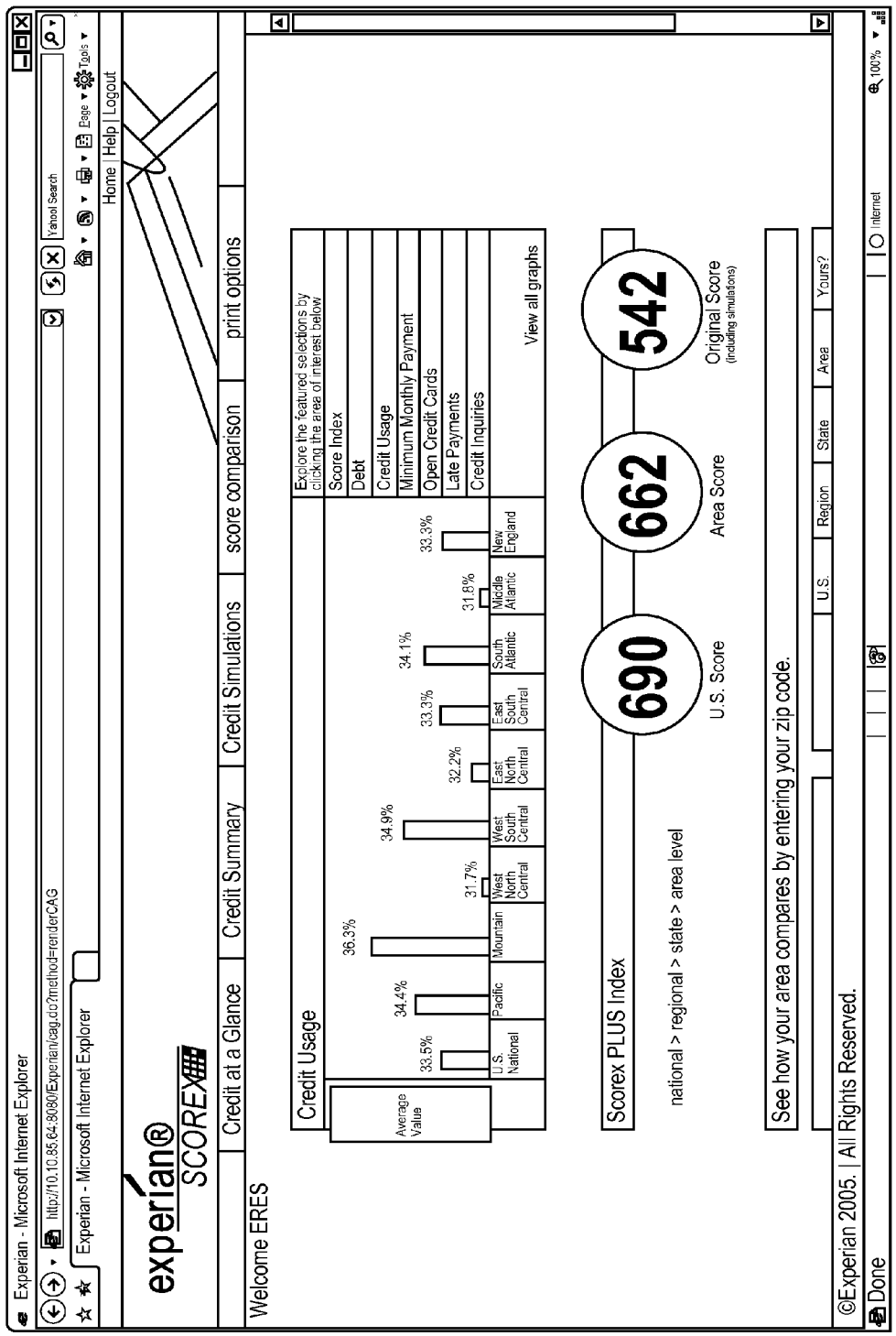
Figure 23F:
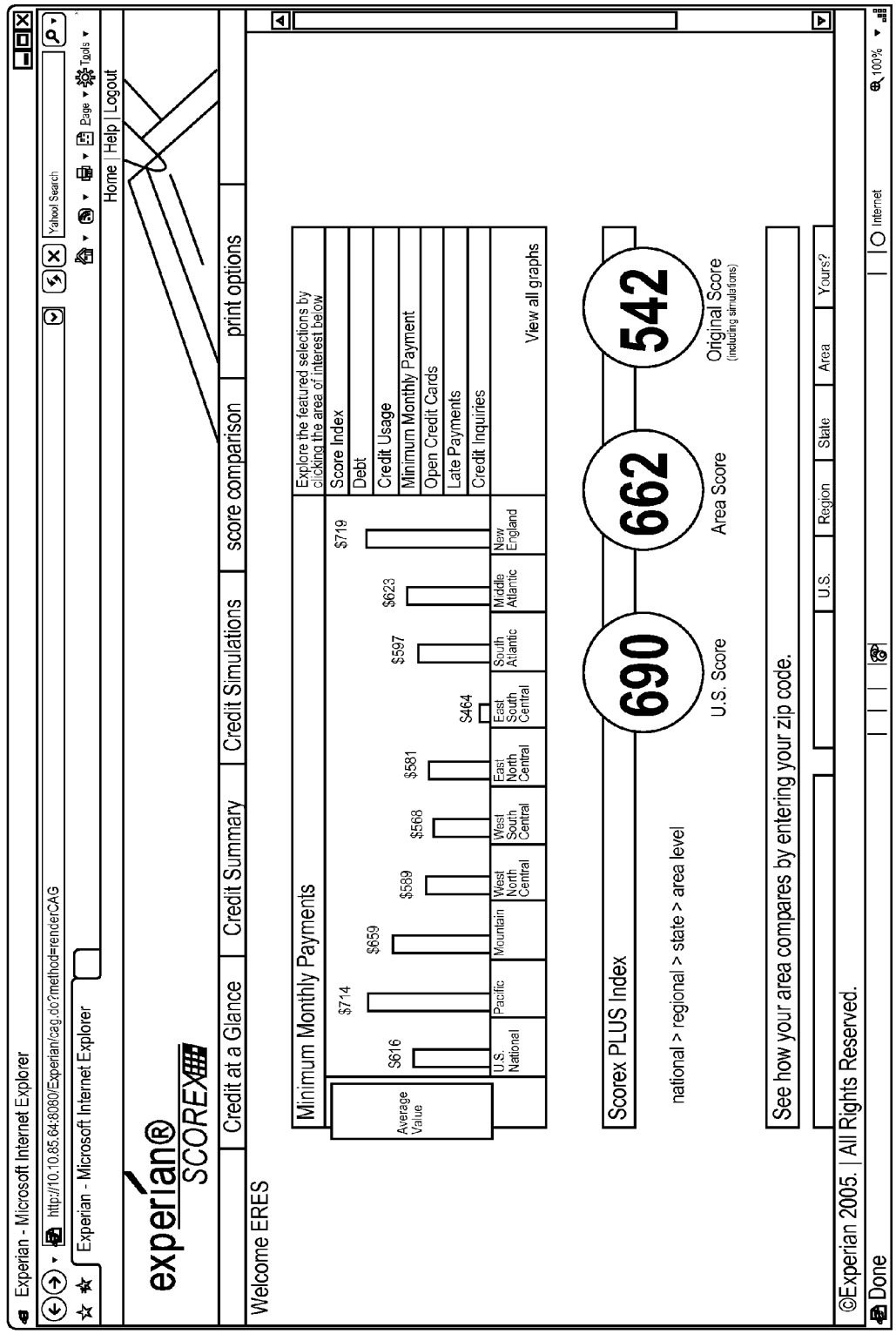
Figure 23G:
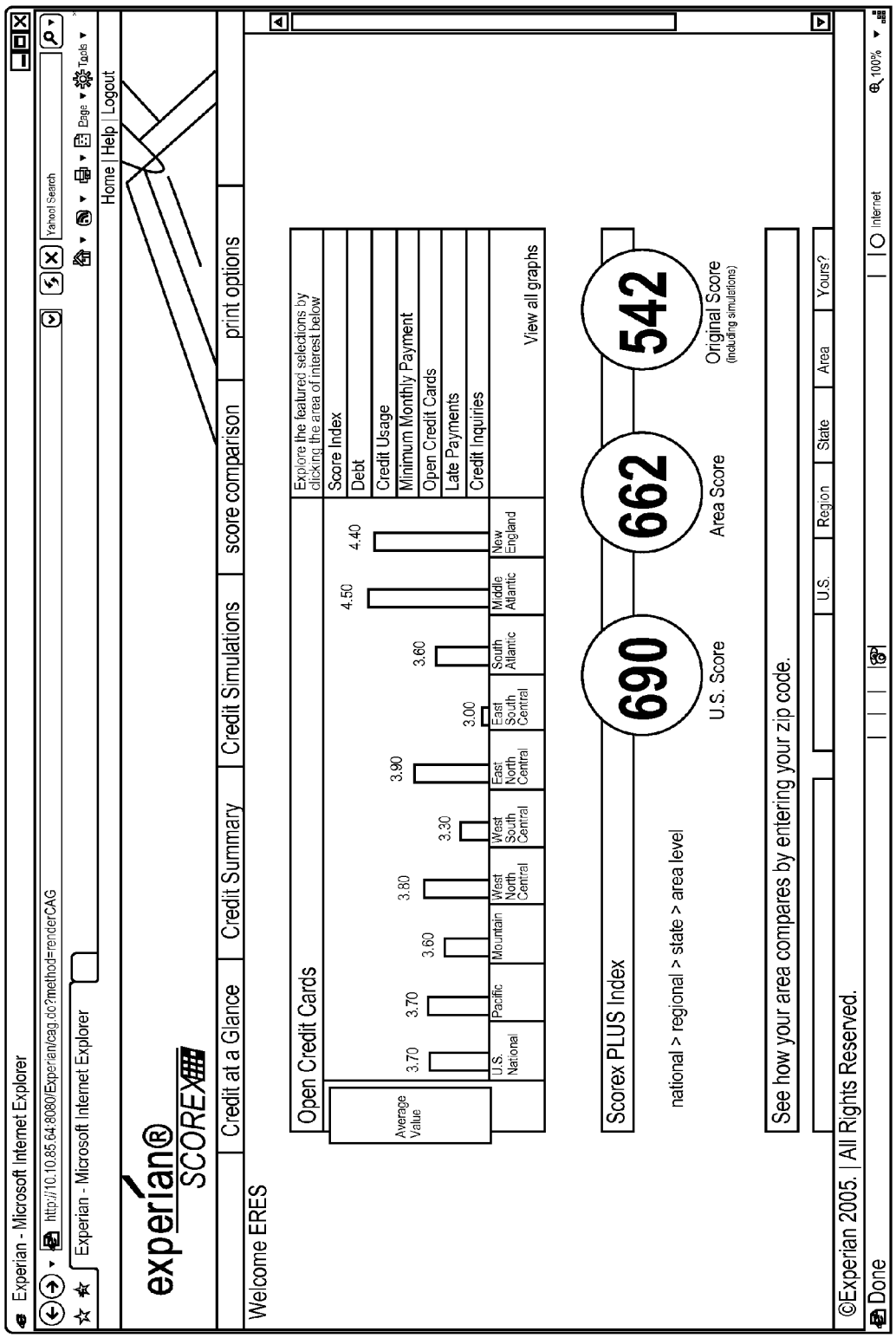
Figure 23H:
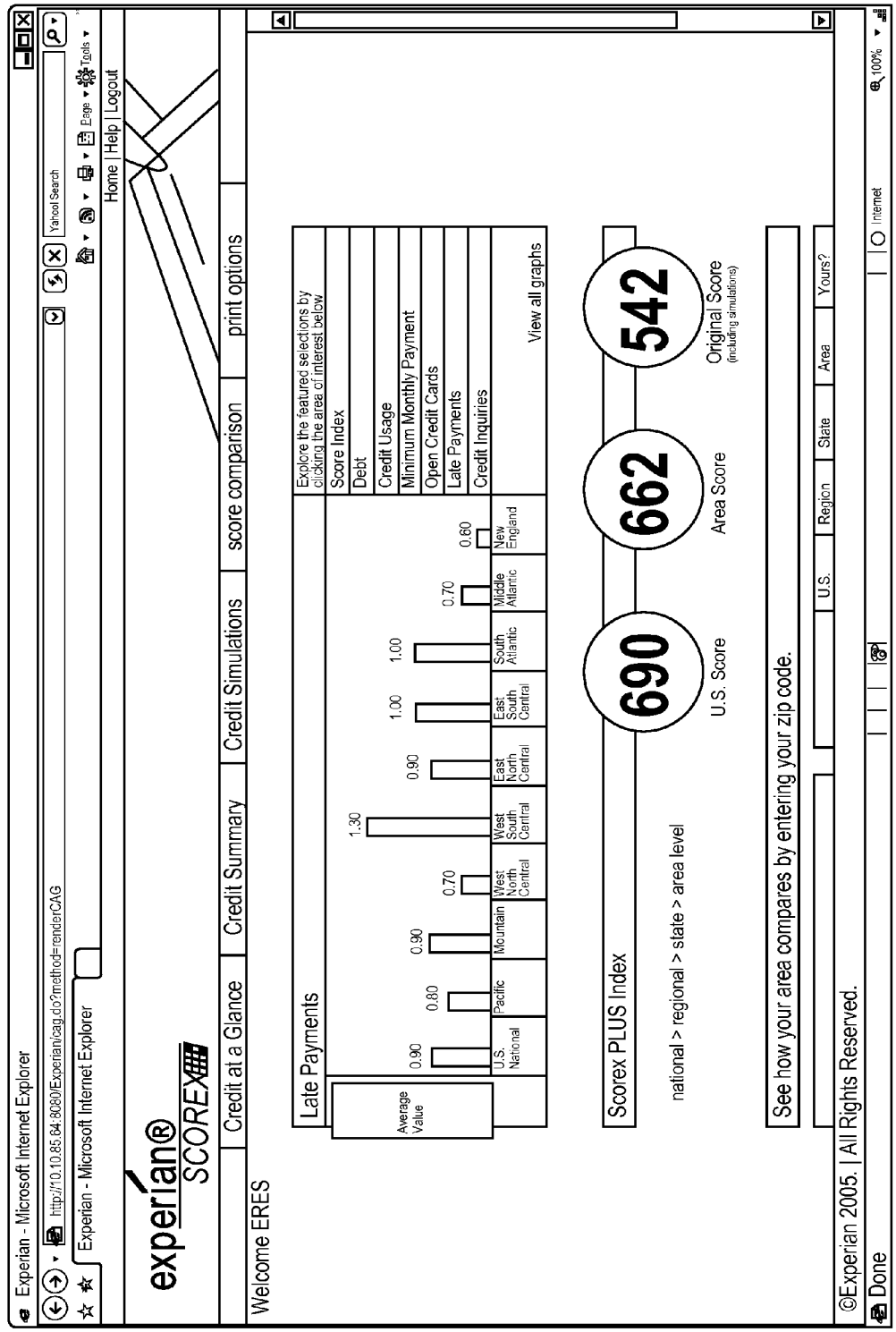
Figure 23I:
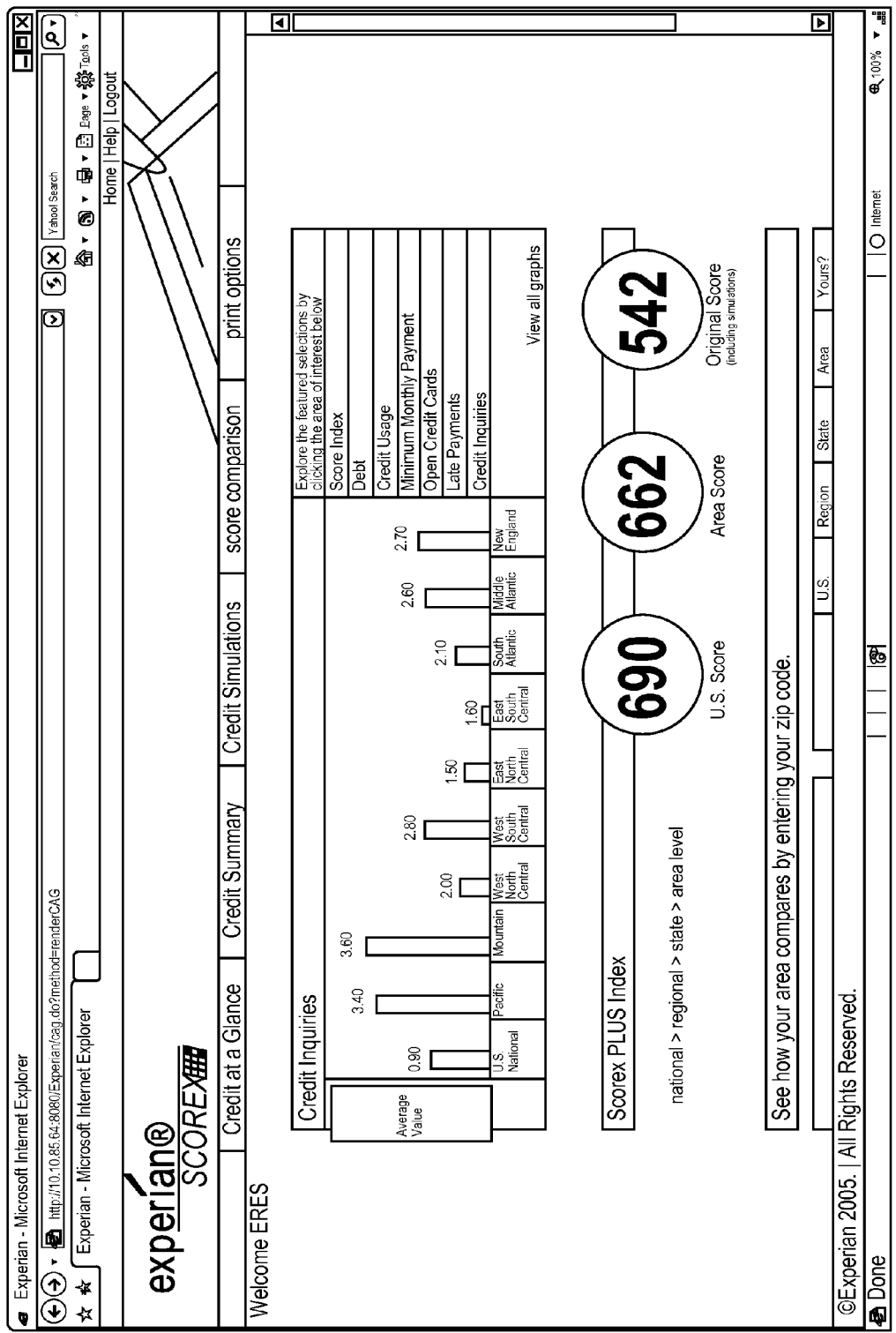
Figure 23J:
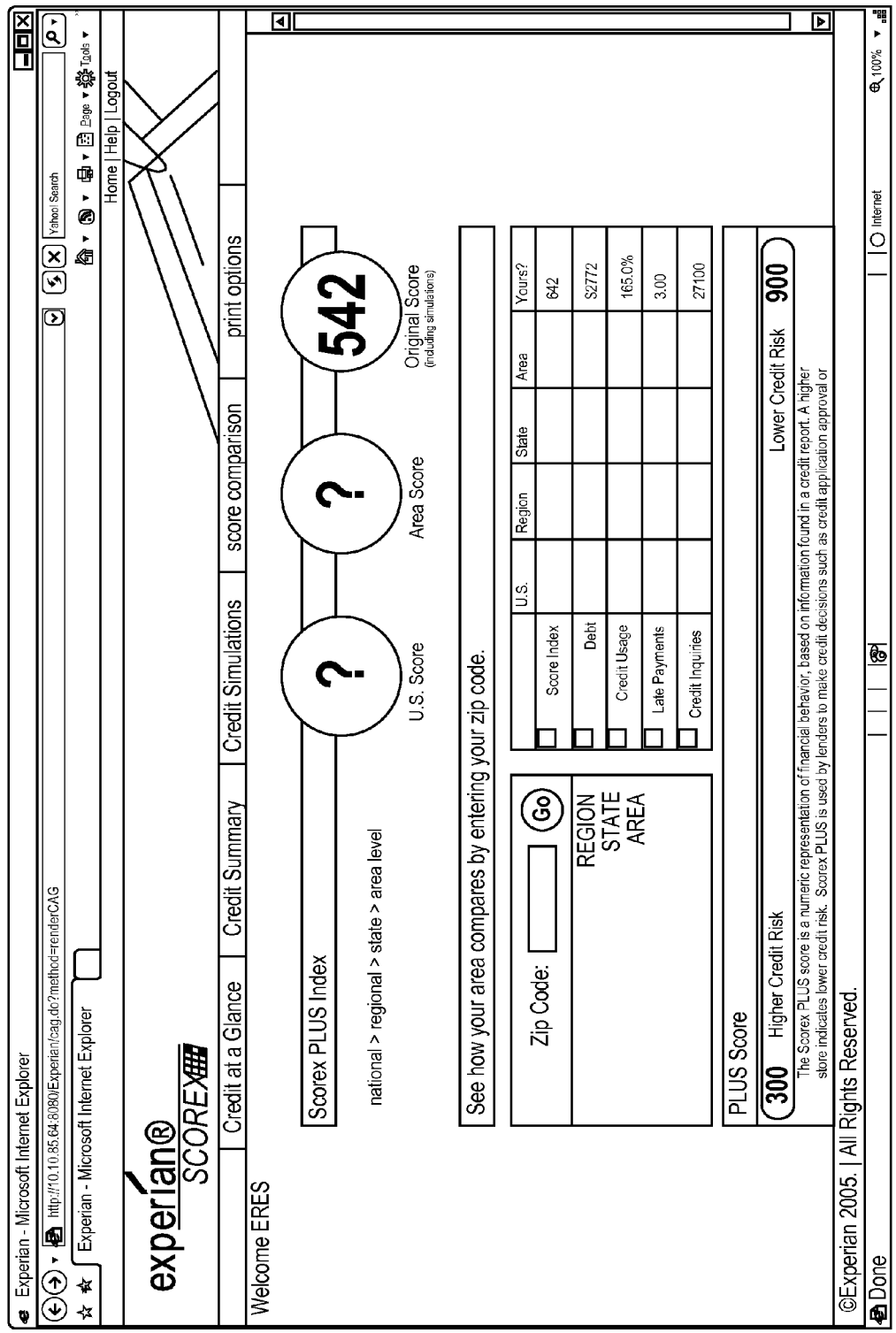
Figure 23K:
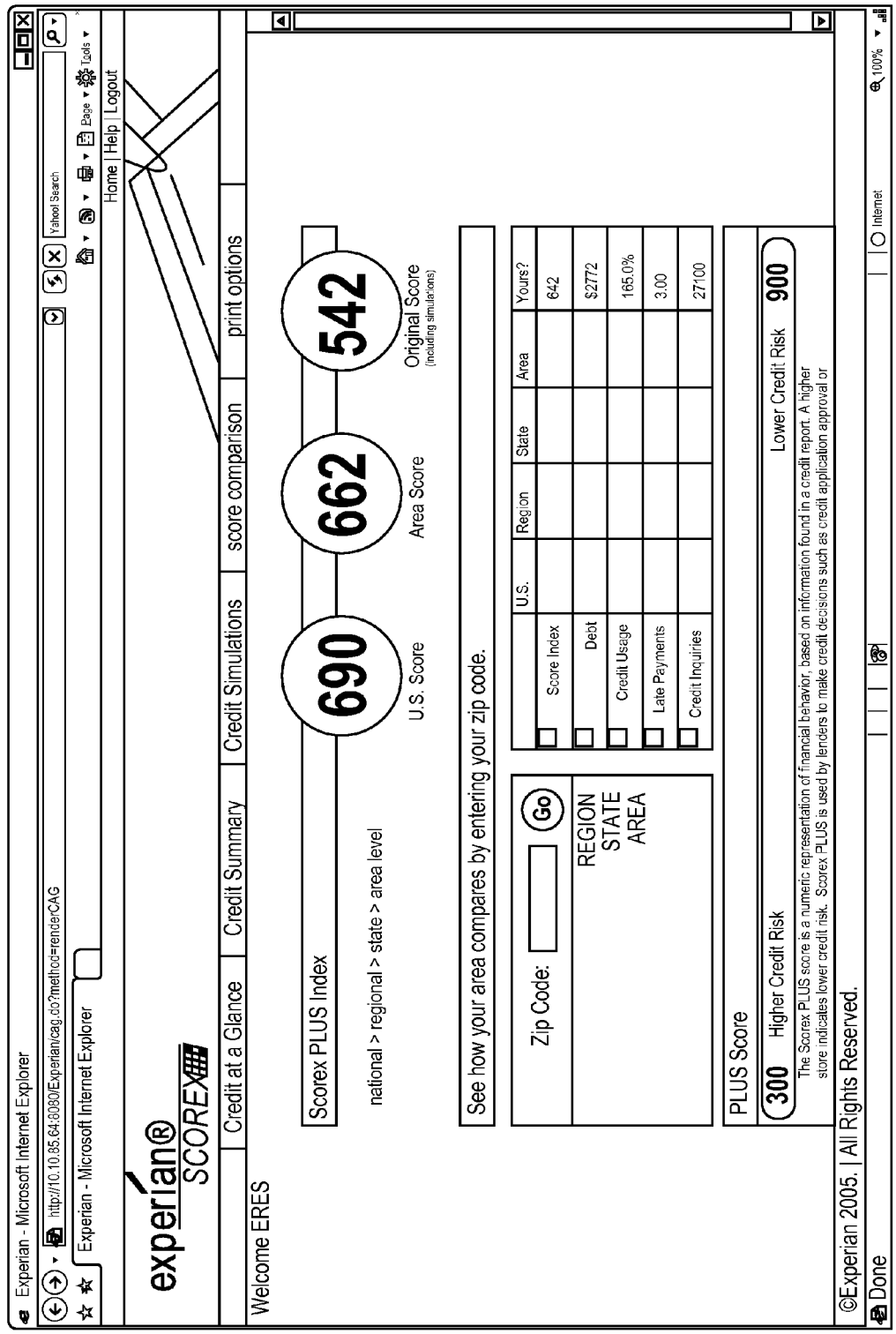

In FIG. 17, the user has entered "3000" for the first question, thereby indicating that she wants to know how to allocate $3000 (or less) in order to maximize the credit score. The user then selects the first Find Out button 1700. FIG. 18 is a user interface that shows simulation options and a Common Simulations area with simulation options based on a specified dollar value, according to one embodiment of the invention. For this question, one action (or set of actions) is determined. In the illustrated embodiment, three simulations are performed, each using data from a different credit bureau. As a result, three actions (or sets of actions) are returned—one for each credit bureau. In the illustrated embodiment, the set of actions returned for Experian includes "Pay $1115 to ASSOC/CITI . . . , $633 to UNITED CREDIT NATIONAL, $750 to BURDINES/FDSB, $339 to CAPITAL ONE BANK . . . ."

The sets of actions returned for Equifax and TransUnion are different. The Equifax set of actions includes paying money to BESTBUY and doesn't include paying money to UNITED CREDIT NATIONAL. Also, while the Equifax set of actions allocates money to ASSOC/CITI, BURDINES/FDSB, and CAPITAL ONE BANK, the amounts allocated are different. Similarly, the TransUnion set of actions allocates money to ASSOC/CITI, BURDINES/FDSB, and CAPITAL ONE BANK, but in different amounts from Experian and Equifax.

Note that the total amount of money allocated in each of these sets of actions is actually less than the amount of money available (here, $3000). This reflects the fact that allocating more money doesn't always increase a credit score. Whether it does or not depends on the scoring algorithm used the by score module 220.

Figure 19:
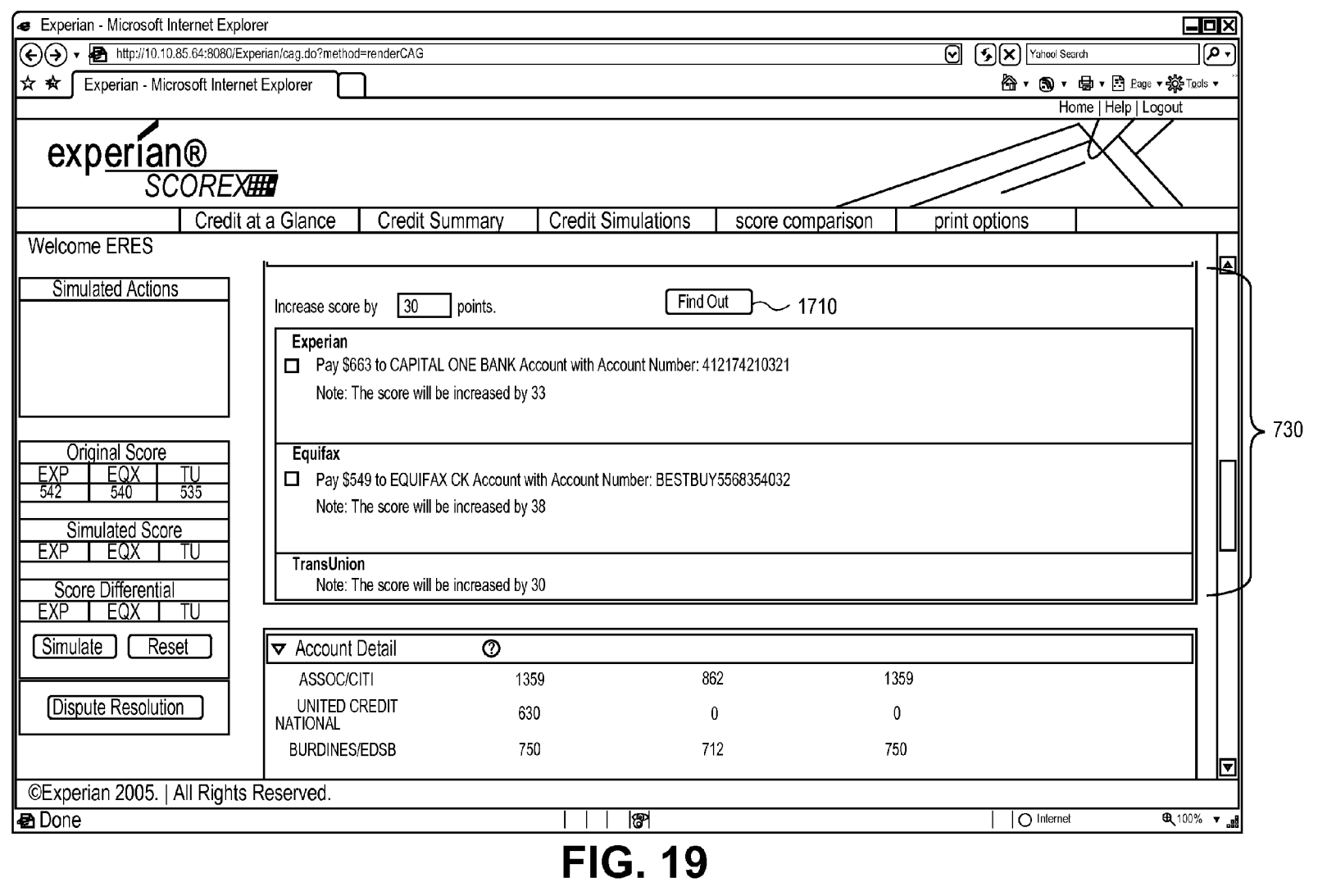

FIG. 19 is a user interface that shows simulation options and a Common Simulations area with simulation options based on a specified point value, according to one embodiment of the invention. Here, the user has entered "30" for the second question, thereby indicating that she wants to know which actions (or sets of actions) will increase the score by 30 points or more. The user then selected the second Find Out button 1710.

For this question, one or more actions (or sets of actions) are determined. In the illustrated embodiment, three simulations are performed, each using data from a different credit bureau. As a result, three groups of actions (or sets of actions) are returned—one for each credit bureau. In the illustrated embodiment, the action returned for Experian is "Pay $663 to CAPITAL ONE BANK Account . . . " (which will increase that score by 33 points), while the action returned for Equifax is "Pay $549 to EQUIFAX CK Account . . . " (which will increase that score by 38 points). No action was returned for TransUnion because that score cannot be increased by 30 points. In another embodiment (not shown), if the requested point increase is not possible, then an action or (set of actions) will be returned that achieves the highest point increase that is possible.

In one embodiment, for this latter question, the one action (or set of actions) that will increase the score the most (and at least by x points) is determined. In another embodiment, the top x actions (or sets of actions) are determined (i.e., the x actions, or sets of actions, that will increase the score the most, and at least by x points). In yet another embodiment, all actions (or sets of actions) that will increase the score by at least x points are determined. Other embodiments can show different numbers or types of actions. In addition, other embodiments can enable the user to specify characteristics of the actions, such as an amount of money to be allocated and/or when the allocation should be made.

Returning now to FIG. 3, simulation options are presented 350 to the user. The user selects one or more options, as described above, thereby indicating a scenario to simulate. For example, the user selects one or more actions from the Suggested Actions area 720 and/or changes the values of one or more fields in the Account Detail area 740. The user selects the Simulate button 750, and the option information is received 360.

The scenario module 210 generates 330 one or more (modified) scenarios based on the current credit data elements and the received simulation options. These scenarios are the same as the previous scenarios, except that one or more credit data elements have been modified based on the simulation option information. The score module 220 determines 340 one or more simulated scores based on the one or more scenarios. The presentation module 240 formats the one or more original credit score and the one or more simulated credit scores to generate a user interface, and they are presented 350 to the user, along with one or more simulation options. The user can now change the simulations options and run another simulation.

FIGS. 20A-B are user interfaces that show simulation options, according to one embodiment of the invention. The illustrated embodiment shows the following: a Suggested Actions area 3B; a Compare button 3C1 (to trigger a Tri-Bureau Comparison); an Update Risk Score (dispute resolution) button 3C2; a Suggested Actions area 3C; five Common Simulations areas (Money 3D, Time 3E, New Credit 3F, Negative Behavior 3K, and Information Only 3L); an Account Detail area 3M (including a 24 Month Payment History area 3N), a Start Over (reset) button, a Simulated Actions area 3G, an Original Score area 3H, a Simulated Score area (3i), a Differential Score area 3J, and a Simulate button.

Note that the Common Simulations areas 3D, 3E, 3F, 3K, 3L offer additional simulation options than were shown in the Common Simulations area 730 shown in FIG. 17. For example, the Money Common Simulations area 3D can simulate paying down total collections debt by a dollar amount or by a percentage. The Time Common Simulations area 3E can simulate paying minimum payments on all accounts and keeping accounts current for one month. The New Credit Common Simulations area 3F can simulate refinancing an existing mortgage for a new dollar amount. The Negative Behaviors Common Simulations area 3K can simulate filing for bankruptcy. The Information Only Common Simulations area 3L can simulate removing all public record items.

FIG. 20A also shows a Positive/Negative Factors area 3A and an Undo Last button. The Positive/Negative Factors area 3A identifies the positive factors and the negative factors that contributed most to determining the credit score. In the illustrated embodiment, there are three set of positive and negative factors: one for each credit bureau. The Undo Last button enables a user to reverse a simulation. In other words, the simulation can be returned to its previous state, before the Simulate button was selected.

Figure 24A:
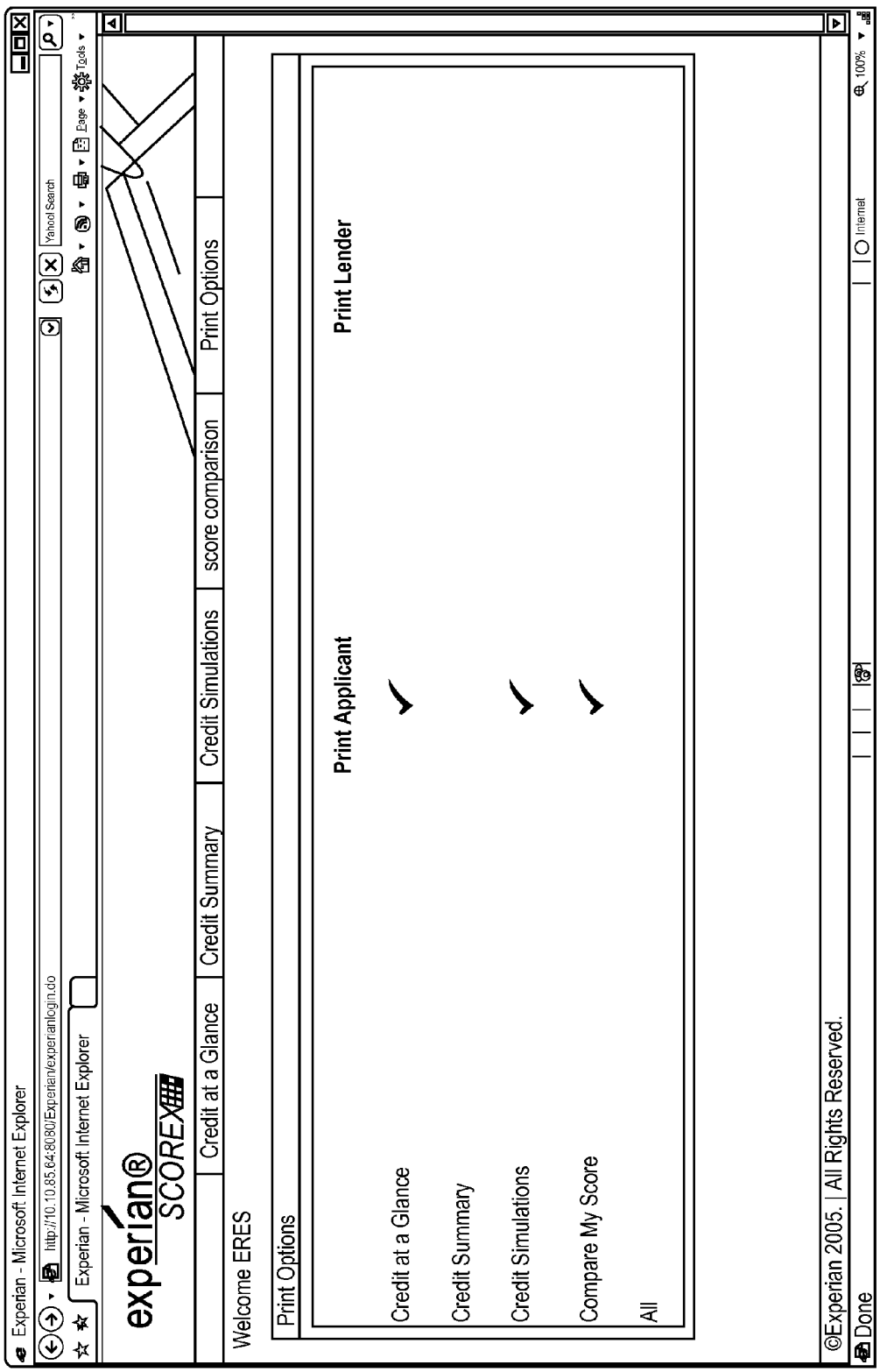
FIGS. 24A-B are user interfaces that show the print options topic, according to multiple embodiments of the invention.
Figure 24B:

Other embodiments also include additional user interface features, such as tabs that can be used to navigate between different topics such as credit at a glance, credit summary, credit simulations, score comparison, and print options. As described above, FIGS. 7-19 and 20A-B show various views available for the credit simulations tab, according to multiple embodiments of the invention. FIGS. 21A-C are user interfaces that show the credit at a glance topic, according to multiple embodiments of the invention. FIGS. 22A-F are user interfaces that show the credit summary topic, according to multiple embodiments of the invention. FIGS. 23A-L are user interfaces that show the score comparison topic, according to multiple embodiments of the invention. FIGS. 24A-B are user interfaces that show the print options topic, according to multiple embodiments of the invention.

Although the invention has been described in considerable detail with reference to certain embodiments thereof, other embodiments are possible as will be understood to those skilled in the art.

What is claimed is:

1. A system for simulating a financial risk score, the method comprising:
    computer hardware comprising a computer processor and computer memory in communication with the computer processor, wherein the computer processor is configured to execute instructions stored in the computer memory to cause the computer hardware to perform operations defined by the instructions;
    means for receiving financial data about a consumer and an initial financial risk score of the consumer that is calculated based upon the financial data;
    means for receiving a financial objective related to improving the financial risk score of the consumer; and
    means for running a plurality of scenarios in which hypothetical changes are made to the financial data;
    means for generating a simulated financial risk score for each of the scenarios;
    means for comparing the simulated financial risk scores with the initial financial risk score;
    means for identifying at least one scenario that would achieve the financial objective based upon the simulated financial risk score for that scenario; and
    means for communicating the hypothetical changes and the simulated financial risk score associated with the identified scenario.

2. The system of claim 1, wherein the means for communicating communicates the hypothetical changes and the simulated financial risk score associated with the identified scenario to an automated process.

3. The system of claim 1, wherein the means for communicating communicates the hypothetical changes and the simulated financial risk score associated with the identified scenario to a computer user.

4. The system of claim 1, wherein the means for communicating communicates the hypothetical changes and the simulated financial risk score associated with the identified scenario to the consumer.

5. The system of claim 1, wherein the financial objective is selected from a group that includes identifying hypothetical changes that would increase the initial financial risk score a desired amount by allocation of a specified amount of money.

6. The system of claim 5, wherein the desired amount is or is about the highest increase for all of the scenarios that were run.

7. The system of claim 1, wherein the financial objective is selected from a group that includes identifying hypothetical changes that would increase the initial financial risk score by a specified number of points.

8. The system of claim 1, further comprising means for determining how many scenarios to run based, at least in part, upon the financial objective.

9. The system of claim 1, further comprising means for determining how many scenarios to run based upon a function that correlates a number of scenarios run with the accuracy that would be achieved by running that number of scenarios.

10. The system of claim 9, wherein the accuracy increases as the number of scenarios increases.

11. The system claim 1, further comprising means for determining a set of scenarios that are likely to include a scenario that achieves an optimal or near optimal result in accordance with the financial objective.

\* \* \* \* \*

UNITED STATES PATENT AND TRADEMARK OFFICE
CERTIFICATE OF CORRECTION

| | | |
|---|---|---|
| PATENT NO. | : 8,589,286 B1 | Page 1 of 1 |
| APPLICATION NO. | : 13/620527 | |
| DATED | : November 19, 2013 | |
| INVENTOR(S) | : Kornegay et al. | |

It is certified that error appears in the above-identified patent and that said Letters Patent is hereby corrected as shown below:

In the Claims

In column 20 at line 14, In Claim 11, after "system" insert --of--.

Signed and Sealed this
Tenth Day of November, 2015

Michelle K. Lee
*Director of the United States Patent and Trademark Office*